(12) United States Patent
Lewis et al.

(10) Patent No.: US 12,125,139 B2
(45) Date of Patent: Oct. 22, 2024

(54) COMPUTER VISION SYSTEMS AND METHODS FOR GENERATING BUILDING MODELS USING THREE-DIMENSIONAL SENSING AND AUGMENTED REALITY TECHNIQUES

(71) Applicant: Insurance Services Office, Inc., Jersey City, NJ (US)

(72) Inventors: Jeffery Devon Lewis, Orem, UT (US); Corey David Reed, Cedar Hills, UT (US); Logan Lawrence, Orem, UT (US); Brandon O'Very, Saratoga Springs, UT (US)

(73) Assignee: Insurance Services Office, Inc., Jersey City, NJ (US)

( * ) Notice: Subject to any disclaimer, the term of this patent is extended or adjusted under 35 U.S.C. 154(b) by 51 days.

(21) Appl. No.: 17/895,500

(22) Filed: Aug. 25, 2022

(65) Prior Publication Data

US 2022/0414980 A1 Dec. 29, 2022

Related U.S. Application Data

(63) Continuation-in-part of application No. 17/705,130, filed on Mar. 25, 2022, now Pat. No. 11,688,135.
(Continued)

(51) Int. Cl.
*G06T 19/00* (2011.01)
*G06F 3/04845* (2022.01)
(Continued)

(52) U.S. Cl.
CPC .......... *G06T 17/00* (2013.01); *G06F 3/04845* (2013.01); *G06T 7/13* (2017.01);
(Continued)

(58) Field of Classification Search
None
See application file for complete search history.

(56) References Cited

U.S. PATENT DOCUMENTS

| 5,701,403 A | 12/1997 | Watanabe et al. |
| 6,446,030 B1 | 9/2002 | Hoffman et al. |

(Continued)

FOREIGN PATENT DOCUMENTS

| WO | 2014/151122 A1 | 9/2014 |
| WO | 2016/154306 A1 | 9/2016 |
| WO | 2017/100658 A1 | 6/2017 |

OTHER PUBLICATIONS

International Search Report of the International Searching Authority mailed on Mar. 27, 2017, issued in connection with International Application No. PCT/US2016/65947 (3 pages).
(Continued)

*Primary Examiner* — Nicholas R Wilson
(74) *Attorney, Agent, or Firm* — McCarter & English, LLP

(57) ABSTRACT

Computer vision systems and methods for generating building models using three-dimensional sensing and augmented reality (AR) techniques are provided. Image frames including images of a structure to be modeled are captured by a camera of a mobile device such as a smart phone, as well as three-dimensional data corresponding to the image frames. An object of interest, such as a structural feature of the building, is detected using both the image frames and the three-dimensional data. An AR icon is determined based upon the type of object detected, and is displayed on the mobile device superimposed on the image frames. The user can manipulate the AR icon to better fit or match the object of interest in the image frames, and can capture the object of interest using a capture icon displayed on the display of the mobile device.

26 Claims, 35 Drawing Sheets

Related U.S. Application Data

(60) Provisional application No. 63/165,972, filed on Mar. 25, 2021.

(51) Int. Cl.
   | | |
   |---|---|
   | *G06T 7/13* | (2017.01) |
   | *G06T 7/60* | (2017.01) |
   | *G06T 17/00* | (2006.01) |
   | *G06F 3/04817* | (2022.01) |

(52) U.S. Cl.
   CPC .............. *G06T 7/60* (2013.01); *G06T 19/006* (2013.01); *G06F 3/04817* (2013.01); *G06T 2200/24* (2013.01); *G06T 2207/20092* (2013.01); *G06T 2207/20164* (2013.01)

(56) References Cited

U.S. PATENT DOCUMENTS

| | | | |
|---|---|---|---|
| 6,448,964 | B1 | 9/2002 | Isaacs et al. |
| 8,533,063 | B2 | 9/2013 | Erickson |
| 8,843,304 | B1 | 9/2014 | Dupont et al. |
| 8,868,375 | B1 | 10/2014 | Christian |
| 8,983,806 | B2 | 3/2015 | Labrie et al. |
| 9,158,869 | B2 | 10/2015 | Labrie et al. |
| 9,430,871 | B2 | 8/2016 | Neophytou et al. |
| 9,501,700 | B2 | 11/2016 | Loveland et al. |
| 9,679,227 | B2 | 6/2017 | Taylor et al. |
| 10,127,670 | B2 | 11/2018 | Lewis et al. |
| 10,181,079 | B2 | 1/2019 | Labrie et al. |
| 10,289,760 | B1 | 5/2019 | Oakes, III et al. |
| 10,387,582 | B2 | 8/2019 | Lewis et al. |
| 10,445,438 | B1 | 10/2019 | Motonaga et al. |
| 10,529,028 | B1 | 1/2020 | Davis et al. |
| 11,314,905 | B2 | 4/2022 | Childs et al. |
| 11,688,135 | B2 | 6/2023 | Lewis et al. |
| 11,688,186 | B2 | 6/2023 | Harris et al. |
| 11,734,468 | B2 | 8/2023 | Lewis et al. |
| 2002/0116254 | A1 | 8/2002 | Stein et al. |
| 2003/0009315 | A1 | 1/2003 | Thomas et al. |
| 2007/0080961 | A1 | 4/2007 | Inzinga et al. |
| 2007/0276626 | A1 | 11/2007 | Bruffey |
| 2009/0179895 | A1 | 7/2009 | Zhu et al. |
| 2010/0110074 | A1 | 5/2010 | Pershing |
| 2010/0114537 | A1 | 5/2010 | Pershing |
| 2010/0296693 | A1 | 11/2010 | Thornberry et al. |
| 2011/0056286 | A1 | 3/2011 | Jansen |
| 2011/0157213 | A1 | 6/2011 | Takeyama et al. |
| 2011/0191738 | A1 | 8/2011 | Walker et al. |
| 2012/0026322 | A1 | 2/2012 | Malka et al. |
| 2012/0179431 | A1 | 7/2012 | Labrie et al. |
| 2012/0253725 | A1 | 10/2012 | Malka et al. |
| 2012/0253751 | A1 | 10/2012 | Malka et al. |
| 2013/0201167 | A1 | 8/2013 | Oh et al. |
| 2013/0206177 | A1 | 8/2013 | Burlutskiy |
| 2013/0226451 | A1 | 8/2013 | O'Neill et al. |
| 2013/0262029 | A1 | 10/2013 | Pershing |
| 2013/0267260 | A1 | 10/2013 | Chao et al. |
| 2013/0314688 | A1 | 11/2013 | Likholyot |
| 2014/0043436 | A1 | 2/2014 | Bell et al. |
| 2014/0195275 | A1 | 7/2014 | Pershing et al. |
| 2014/0301633 | A1 | 10/2014 | Furukawa et al. |
| 2014/0320661 | A1 | 10/2014 | Sankar et al. |
| 2015/0029182 | A1 | 1/2015 | Sun et al. |
| 2015/0073864 | A1 | 3/2015 | Labrie et al. |
| 2015/0093047 | A1 | 4/2015 | Battcher et al. |
| 2015/0116509 | A1 | 4/2015 | Birkler et al. |
| 2015/0153172 | A1 | 6/2015 | Starns et al. |
| 2015/0193971 | A1 | 7/2015 | Dryanovski et al. |
| 2015/0213558 | A1 | 7/2015 | Nelson |
| 2015/0227645 | A1 | 8/2015 | Childs et al. |
| 2015/0269438 | A1 | 9/2015 | Samarasekera et al. |
| 2015/0302529 | A1 | 10/2015 | Jagannathan |
| 2016/0098802 | A1 | 4/2016 | Bruffey et al. |
| 2016/0110480 | A1 | 4/2016 | Randolph |
| 2016/0246767 | A1 | 8/2016 | Makadia et al. |
| 2016/0282107 | A1 | 9/2016 | Roland et al. |
| 2017/0124713 | A1 | 5/2017 | Jurgenson et al. |
| 2017/0132711 | A1 | 5/2017 | Bruffey et al. |
| 2017/0132835 | A1 | 5/2017 | Halliday et al. |
| 2017/0169459 | A1 | 6/2017 | Bruffey et al. |
| 2017/0193297 | A1 | 7/2017 | Michini et al. |
| 2017/0206648 | A1 | 7/2017 | Marra et al. |
| 2017/0221152 | A1 | 8/2017 | Nelson et al. |
| 2017/0316115 | A1 | 11/2017 | Lewis et al. |
| 2017/0330207 | A1 | 11/2017 | Labrie et al. |
| 2017/0345069 | A1 | 11/2017 | Labrie et al. |
| 2018/0053329 | A1 | 2/2018 | Roberts et al. |
| 2018/0067593 | A1 | 3/2018 | Tiwari et al. |
| 2018/0089833 | A1 | 3/2018 | Lewis et al. |
| 2018/0286098 | A1 | 10/2018 | Lorenzo |
| 2018/0330528 | A1 | 11/2018 | Loveland et al. |
| 2018/0357819 | A1 | 12/2018 | Oprea |
| 2018/0373931 | A1 | 12/2018 | Li |
| 2019/0114717 | A1 | 4/2019 | Labrie et al. |
| 2019/0147247 | A1 | 5/2019 | Harris et al. |
| 2019/0221040 | A1 | 7/2019 | Shantharam et al. |
| 2019/0340692 | A1 | 11/2019 | Labrie et al. |
| 2019/0347859 | A1* | 11/2019 | Jovanovic ............. G06T 19/006 |
| 2019/0377837 | A1 | 12/2019 | Lewis et al. |
| 2020/0100066 | A1 | 3/2020 | Lewis et al. |
| 2020/0143481 | A1 | 5/2020 | Brown et al. |
| 2021/0076162 | A1 | 3/2021 | Wang et al. |
| 2021/0103687 | A1 | 4/2021 | Harris et al. |
| 2021/0350038 | A1 | 11/2021 | Jenson et al. |
| 2022/0309204 | A1 | 9/2022 | Childs et al. |
| 2022/0309748 | A1 | 9/2022 | Lewis et al. |
| 2023/0343030 | A1 | 10/2023 | Lewis et al. |
| 2023/0409769 | A1 | 12/2023 | Lewis et al. |

OTHER PUBLICATIONS

Written Opinion of the International Searching Authority mailed on Mar. 27, 2017, issued in connection with International Application No. PCT/US2016/65947 (7 pages).

Office Action mailed Sep. 26, 2018, issued in connection with U.S. Appl. No. 15/374,695 (33 pages).

Notice of Allowance mailed May 13, 2019, issued in connection with U.S. Appl. No. 15/374,695 (7 pages).

Extended European Search Report mailed Jun. 11, 2019, issued in connection with European Patent Application No. 16873975.3 (8 pages).

Communication Pursuant to Article 94(3) EPC issued by the European Patent Office mailed on Apr. 22, 2020, issued in connection with European Patent Application No. 16873975.3 (6 pages).

International Search Report of the International Searching Authority mailed on Dec. 12, 2019, issued in connection with International Application No. PCT/US2019/52670 (3 pages).

Written Opinion of the International Searching Authority mailed on Dec. 12, 2019, issued in connection with International Application No. PCT/US2019/52670 (5 pages).

Office Action mailed Feb. 5, 2020, issued in connection with U.S. Appl. No. 16/580,741 (15 pages).

International Search Report of the International Searching Authority mailed on May 14, 2015, issued in connection with International Application No. PCT/US15/015491(3 pages).

Written Opinion of the International Searching Authority mailed on May 14, 2015, issued in connection with International Application No. PCT/US15/015491 (9 pages).

Fung, et al., "A Mobile Assisted Localization Scheme for Augmented Reality," Department of Computer Science and Engineering, The Chinese University of Hong Kong, 2012 (76 pages).

Sankar, et al., "Capturing Indoor Scenes With Smartphones," UIST'12, Oct. 7-10, 2012, Cambridge, Massachusetts (9 pages).

Office Action mailed Aug. 8, 2017, issued in connection with U.S. Appl. No. 14/620,004 (26 pages).

Office Action mailed Aug. 28, 2018, issued in connection with U.S. Appl. No. 14/620,004 (33 pages).

Farin, et al., "Floor-Plan Reconstruction from Panoramic Images," Sep. 23-28, 2007, MM '07, ACM (4 pages).

(56) References Cited

OTHER PUBLICATIONS

Office Action mailed Mar. 29, 2019, issued in connection with U.S. Appl. No. 14/620,004 (22 pages).
Office Action mailed Dec. 10, 2019, issued in connection with U.S. Appl. No. 14/620,004 (27 pages).
Zhang, et al., "Wallk&Sketch: Create Floor Plans with an RGB-D Camera," Sep. 5-8, 2012, UbiComp '12, ACM (10 pages).
Office Action mailed Jul. 8, 2020, issued in connection with U.S. Appl. No. 14/620,004 (27 pages).
Office Action mailed Sep. 22, 2020, issued in connection with U.S. Appl. No. 16/580,741 (14 pages).
Office Action mailed Feb. 2, 2021, issued in connection with U.S. Appl. No. 14/620,004 (28 pages).
Communication Pursuant to Article 94(3) EPC issued by the European Patent Office mailed on Feb. 18, 2021, issued in connection with European Patent Application No. 16873975.3 (5 pages).
Examination Report No. 1 mailed Mar. 30, 2021, issued by the Australian Patent Office in connection with Australian Patent Application No. 2016366537 (6 pages).
Office Action mailed Apr. 21, 2021, issued in connection with U.S. Appl. No. 16/580,741 (15 pages).
Notice of Allowance mailed Aug. 19, 2021, issued in connection with U.S. Appl. No. 14/620,004 (11 pages).
Examiner-Initiated Interview Summary dated Aug. 10, 2021, issued in connection with U.S. Appl. No. 14/620,004 (1 page).
International Search Report of the International Searching Authority mailed on Feb. 11, 2019, issued in connection with International Application No. PCT/US18/60762 (3 pages).
Written Opinion of the International Searching Authority mailed on Feb. 11, 2019, issued in connection with International Application No. PCT/US18/60762 (7 pages).
Office Action mailed Apr. 16, 2020, issued in connection with U.S. Appl. No. 16/189,512 (10 pages).
U.S. Appl. No. 62/512,989, filed May 31, 2017 entiitled, "Systems and Methods for Rapidly Developing Annotated Computer Models of Structures" (47 pages).
Office Action mailed Dec. 14, 2020, issued in connection with U.S. Appl. No. 16/189,512 (10 pages).
Extended European Search Report dated Jul. 1, 2021, issued by the European Patent Office in connection with European Application No. 18876121.7 (8 pages).
Office Action mailed Jul. 20, 2021, issued in connection with U.S. Appl. No. 16/189,512 (11 pages).
Office Action mailed Dec. 27, 2021, issued in connection with U.S. Appl. No. 16/580,741 (13 pages).
Notice of Allowance mailed Dec. 16, 2021, issued in connection with U.S. Appl. No. 14/620,004 (12 pages).
Invitation to Pay Additional Fees issued by the International Searching Authority mailed on Feb. 2, 2022, issued in connection with International Application No. PCT/US21/63469 (2 pages).
Extended European Search Report dated Feb. 18, 2022, issued in connection with European Patent Application No. 19866788.3 (9 pages).
Office Action dated Feb. 3, 2022, issued by the Canadian Intellectual Property Office in connection with Canadian Application No. 3,007,968 (5 pages).
Office Action dated Mar. 25, 2022, issued in connection with U.S. Appl. No. 16/545,607 (56 pages).
International Search Report of the International Searching Authority mailed on Apr. 8, 2022, issued in connection with International Application No. PCT/US21/63469 (5 pages).
Written Opinion of the International Searching Authority mailed on Apr. 8, 2022, issued in connection with International Application No. PCT/US21/63469 (6 pages).
Notice of Allowance mailed Apr. 8, 2022, issued in connection with U.S. Appl. No. 16/189,512 (8 pages).
Notice of Allowance mailed Jun. 21, 2022, issued in connection with U.S. Appl. No. 16/189,512 (7 pages).
Dino, et al., "Image-Based Construction of Building Energy Models Using Computer Vision," Automation in Construction (2020) (15 pages).
Fathi, et al., "Automated As-Built 3D Reconstruction of Civil Infrastructure Using Computer Vision: Achievements, Opportunities, and Challenges," Advanced Engineering Informatics (2015) (13 pages).
International Search Report of the International Searching Authority mailed on Jul. 25, 2022, issued in connection with International Application No. PCT/US22/22024 (3 pages).
Written Opinion of the International Searching Authority mailed on Jul. 25, 2022, issued in connection with International Application No. PCT/US22/22024 (5 pages).
Office Action dated Sep. 2, 2022, issued in connection with U.S. Appl. No. 16/580,741 (13 pages).
Notice of Allowance mailed Sep. 6, 2022, issued in connection with U.S. Appl. No. 16/189,512 (7 pages).
Office Action mailed Oct. 13, 2022, issued in connection with U.S. Appl. No. 16/545,607 (53 pages).
International Search Report of the International Searching Authority mailed on Nov. 18, 2022, issued in connection with International Application No. PCT/US22/030691 (6 pages).
Written Opinion of the International Searching Authority mailed on Nov. 18, 2022, issued in connection with International Application No. PCT/US22/030691 (11 pages).
Notice of Allowance mailed Dec. 9, 2022, issued in connection with U.S. Appl. No. 17/705,130 (10 pages).
Examination Report No. 1 mailed Dec. 15, 2022, issued by the Australian Patent Office in connection with Australian Patent Application No. 2021282413 (3 pages).
Communication Pursuant to Article 94(3) EPC mailed Jan. 31, 2023, issued in connection with European Patent Application No. 16873975.3 (8 pages).
Notice of Allowance mailed Feb. 14, 2023, issued in connection with U.S. Appl. No. 17/705,130 (5 pages).
Notice of Allowance mailed Mar. 22, 2023, issued in connection with U.S. Appl. No. 16/545,607 (9 pages).
Communication Pursuant to Article 94(3) EPC issued by the European Patent Office mailed on Apr. 28, 2023, issued in connection with European Patent Application No. 19866788.3 (5 pages).
Office Action mailed Jun. 30, 2023, issued in connection with U.S. Appl. No. 17/729,613 (49 pages).
Examination Report No. 1 mailed Apr. 12, 2023, issued by the Australian Patent Office in connection with Australian Patent Application No. 2018364813 (3 pages).
Office Action mailed Dec. 7, 2023, issued by the Canadian Patent Office in connection with Canadian Patent Application No. 3,082,516 (6 pages).
Office Action dated Jan. 12, 2024, issued in connection with U.S. Appl. No. 18/214,842 (4 pages).
International Search Report of the International Searching Authority mailed on Dec. 15, 2023, issued in connection with International Application No. PCT/US2023/031123 (6 pages).
Written Opinion of the International Searching Authority mailed on Dec. 15, 2023, issued in connection with International Application No. PCT/US2023/031123 (7 pages).
Communication Pursuant to Article 94(3) EPC mailed Jan. 23, 2024, issued by the European Patent Office in connection with European Patent Application No. 19866788.3 (5 pages).
Office Action dated Mar. 12, 2024, issued in connection with U.S. Appl. No. 17/122,080 (10 pages).
Sampaio, et al., "Maintenance of Building Components Supported in Interactive Environments," 10th Iberian Conference on Information Systems and Technologies, Jun. 17, 2015 (7 pages).
Office Action dated Mar. 14, 2024, issued in connection with U.S. Appl. No. 18/236,728 (58 pages).
Notice of Allowance dated Mar. 18, 2024, issued in connection with U.S. Appl. No. 17/729,613 (10 pages).
Office Action dated Jun. 4, 2024, issued by the Canadian Intellectual Property Office in connection with Canadian Application No. 3,082,516 (4 pages).

(56) References Cited

OTHER PUBLICATIONS

Notice of Allowance dated Jul. 12, 2024, issued in connection with U.S. Appl. No. 17/729,613 (9 pages).

* cited by examiner

COMPUTER VISION SYSTEMS AND METHODS FOR GENERATING BUILDING MODELS USING THREE-DIMENSIONAL SENSING AND AUGMENTED REALITY TECHNIQUES

RELATED APPLICATIONS

The present application is a continuation-in-part of, and claims priority to, U.S. patent application Ser. No. 17/705,130 filed on Mar. 25, 2022, which claims the priority of U.S. Provisional Application Ser. No. 63/165,972 filed on Mar. 25, 2021, the entire disclosures each of which are expressly incorporated herein by reference.

BACKGROUND

Field of the Invention

The present disclosure relates to computer vision technology. More specifically, the present disclosure relates to computer vision systems and methods for generating building models using three-dimensional sensing and augmented reality techniques.

Related Art

In the insurance underwriting, building construction, solar, and real estate industries, computer-based systems for generating models of physical structures such as residential homes, commercial buildings, etc., is becoming increasingly important. In particular, in order to generate an accurate model of a physical structure, one must have an accurate set of data which adequately describes that structure. Moreover, it is becoming increasingly important to provide computer-based systems which have adequate capabilities to generate floor plans and layouts of both the interior and exterior features of buildings, as well as to identify specific features of such buildings (e.g., doors, windows, closets, etc.).

With the advent of mobile data capturing devices including phones, tablets and ground based vehicles, it is now possible to generate models of structures using such devices. Moreover, the types and quality of sensors available in mobile devices continues to improve as time progresses. For example, today's mobile devices (e.g., smart phones) now come equipped with a wide array of sensors, such as cameras, gyroscopes, accelerometers, infrared sensors, and three-dimensional sensors such as light detection and ranging (LiDAR) sensors. Even further, due to the increased computing power of today's mobile devices, additional technologies such as augmented reality (AR) are being integrated into such devices.

What would be desirable are computer vision systems and methods which allow for the rapid generation of building models of structures, including interior and exterior models of such structures, which harness the very powerful three-dimensional sensing and AR capabilities of today's mobile devices. Accordingly, the computer vision systems and methods of the present disclosure solve these, and other, needs.

SUMMARY

The present disclosure relates to computer vision systems and methods for generating building models using three-dimensional sensing and augmented reality (AR) techniques. Image frames including images of a structure to be modeled (e.g., the interior or exterior of a building) are captured by a camera of a mobile device such as a smart phone, as well as three-dimensional data corresponding to the image frames. The three-dimensional data could be captured using a three-dimensional sensor of the mobile device, or computed from the image frames. An object of interest, such as a structural feature of the building (e.g., wall, ceiling, floor, door, window, exterior surface, roof surface, etc.), is detected using both the image frames and the three-dimensional data. An AR icon is determined based upon the type of object detected, and is displayed on the mobile device superimposed on the image frames. The user can manipulate the AR icon to better fit or match the object of interest in the image frames. If the AR icon matches the object of interest (to the user's satisfaction), the user can capture the object of interest using a capture icon displayed on the display of the mobile device. Successive objects of interest can be captured in the manner described above until all objects of interest have captured, whereupon a complete model of the structure (e.g., a model of the interior or exterior of the structure) can be created.

The system can also generate a model of a building object having complex structures, such as stairs and cabinets. The system can display an AR icon on an image frame comprising at least part of the building object to be modeled. The AR icon can be placed within the image frame at a first corner location (e.g., an end of a stair or a corner of a cabinet) of the building object, and can be moved from the first corner location to a second corner location of the building object (e.g., an opposite end of the stair, or an opposite diagonal corner location of a cabinet face (e.g., a front face, a back face, a side face, a bottom face of the cabinet to be modeled). The system can then generate a model of a building object based at least in part on the first corner location and the second corner location. For example, the system can use the AR icon to capture one or more data points corresponding to a stair (e.g., a width of the stair, a length of the stair, a total rise of the stair, and/or number of threads of the stair), and can extrapolate and model the remaining structure of the stair and/or a larger structure (such as an entire staircase) using the one or more data points of the stair. The system could also use a face capture process and/or a block capture process to outline a cabinet, and use such information to generate a full model of a cabinet. The system could further transmit the model of the cabinet to other software applications as reference blocks for further or future analysis.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to computer vision systems and methods for generating building models using three-dimensional sensing and augmented reality (AR) techniques, as described in detail below in connection with FIGS. 1-14.

Figure 1:
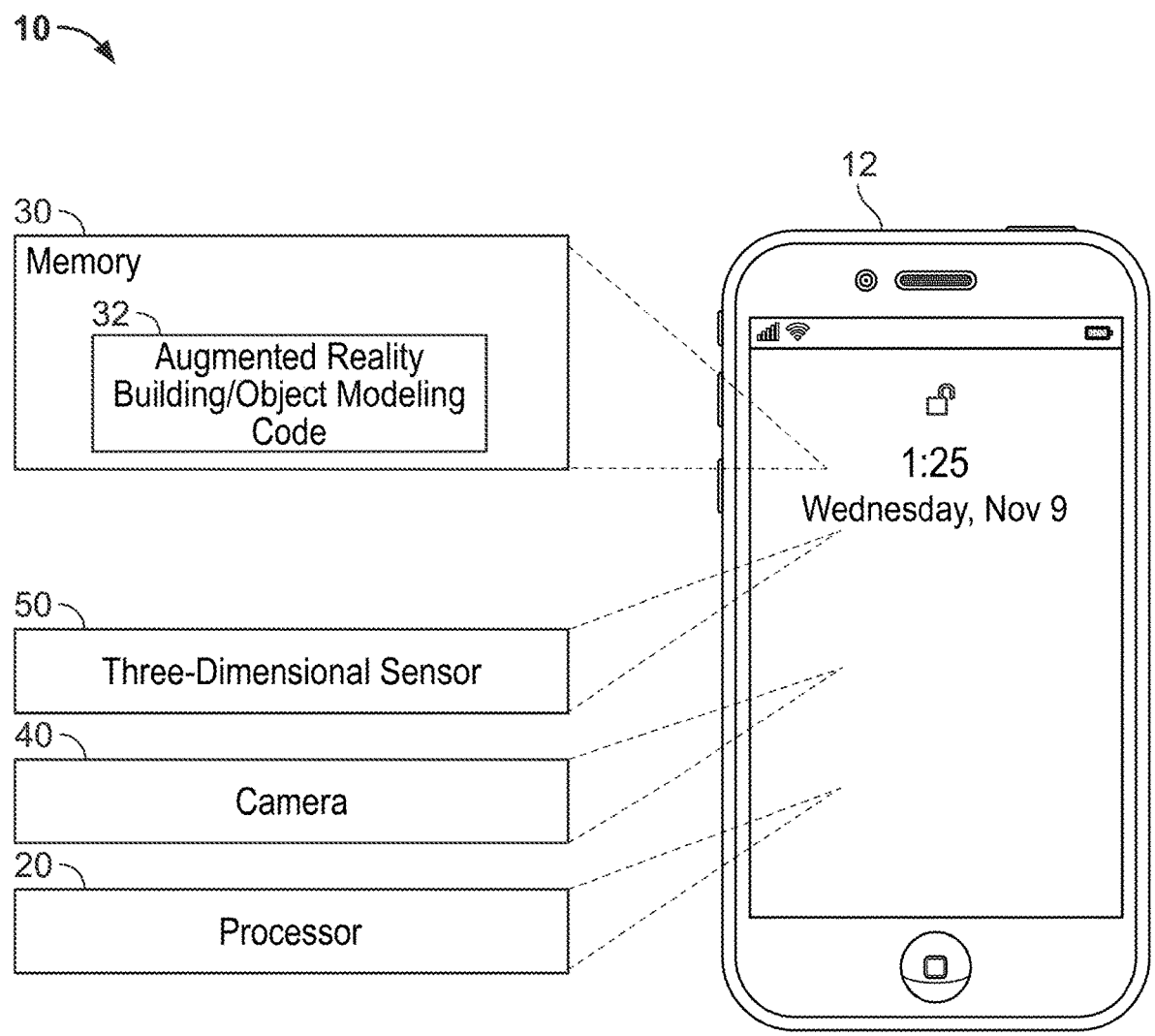
FIG. 1 is a diagram illustrating hardware and software components of the systems and methods of the present disclosure.

FIG. 1 is a diagram illustrating hardware and software components of the systems and methods of the present disclosure, indicated generally at 10. The system 10 includes a mobile device 12, which could be a smart cellular phone, a tablet computer, a laptop computer, a portable computer, or any other mobile computer system capable of being transported and used to inside of, or exterior to, a building. The mobile device 12 includes a processor 20 and a non-transitory, computer-readable memory 30 (e.g., one or more of volatile memory (e.g., random access memory (RAM)) and/or non-volatile memory (e.g., flash memory, electrically-eraseable, programmable, read-only memory (EEPROM)), a memory chip, a memory card, etc.) on which is stored augmented reality building and/or object modeling software code 32. The code 32 includes computer-readable instructions which, when executed by the processor 20, cause the processor to perform the steps disclosed herein for modeling a structure and/or one or more objects in the structure using three-dimensional sensing and AR techniques.

The mobile device 12 also includes a camera 40 for capturing live video (in particular, a plurality of image frames which, together, constitute a video) and a three-dimensional sensor 50 for sensing three-dimensional data corresponding to an interior and/or exterior feature of a building or an object to be modeled. The sensor 50 could be, for example, a light detection and ranging (LiDAR) sensor or other type of three-dimensional sensor which is capable of generating three-dimensional data, such as a point cloud, corresponding to an interior and/or exterior feature of a structure or object to be imaged.

Figure 2:
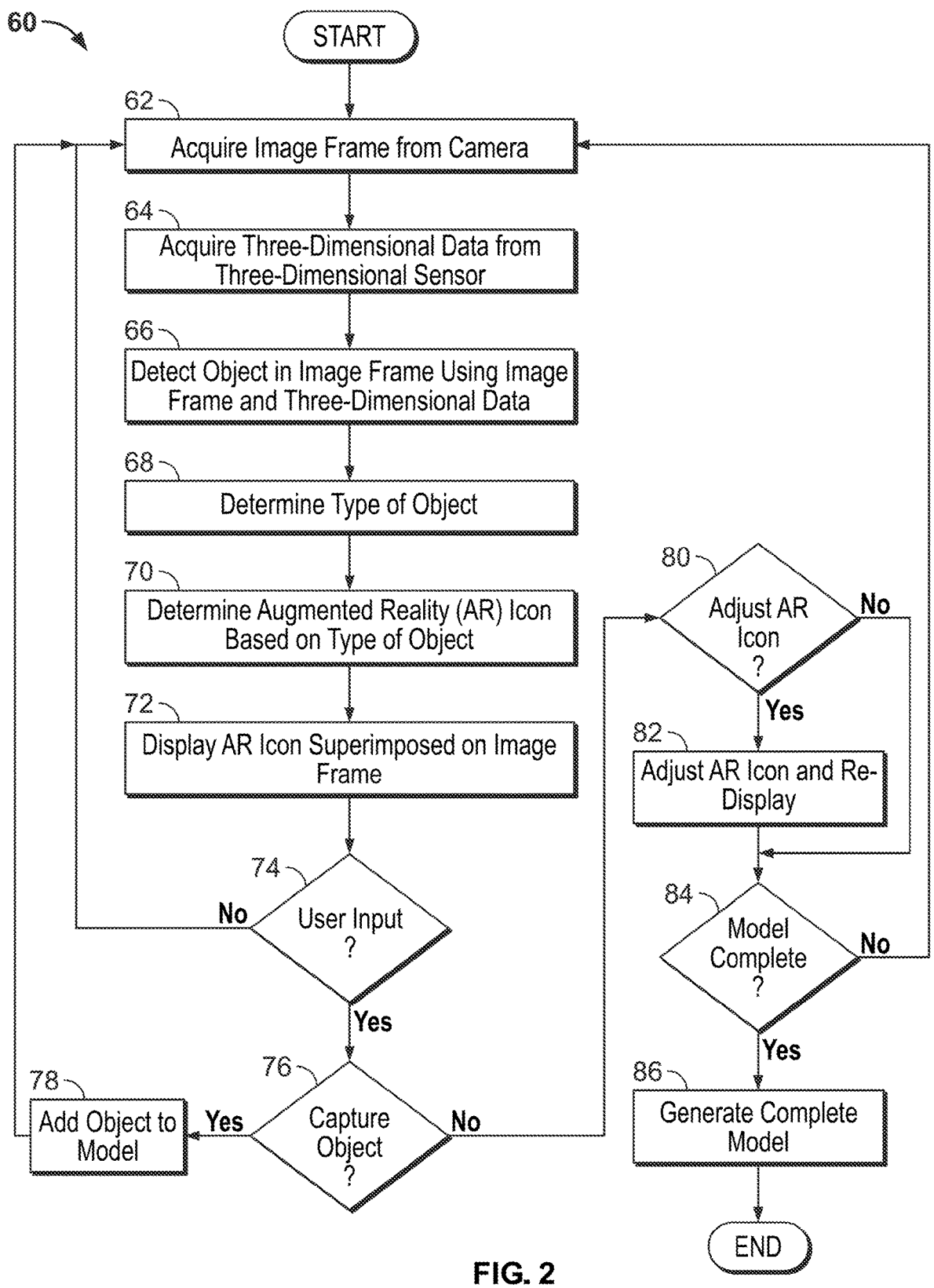
FIG. 2 is a flowchart illustrating processing steps carried out by the systems and methods of the present disclosure.

FIG. 2 is a flowchart illustrating processing steps carried out by the systems and methods of the present disclosure, indicated generally at 60. The steps 60 are embodied as the code 32 stored on the memory 30 of FIG. 1, and are executed by the processor 20 of the mobile device 12. Beginning in step 62, the device 12 acquires an image frame from the camera 40. The image frame could be a single image frame (e.g., the camera only takes a single image frame), or it could be one of a series of image frames being taken by the camera (e.g., an image frame from a real-time video taken by the camera 40). As will be discussed in greater detail in connection with FIGS. 3A-8I, the device 12 is pointed at an interior or exterior feature of a structure or object to be modeled, and such that the camera 40 is pointed to the feature and the feature appears in the image frame captured by the camera 40. In step 64, the camera acquires three-dimensional data corresponding to the feature using the three-dimensional sensor 30 of the device 12. For example, if the three-dimensional sensor 30 is a LiDAR sensor, the three-dimensional data could be a three-dimensional point cloud that includes three-dimensional data (points in a 3D coordinate system) corresponding to the feature displayed in the image frame captured by the camera 40. Thus, the feature is captured in steps 62 and 64 using both two-dimensional data (e.g., a 2D image frame) and three-dimensional data (e.g., a 3D point cloud).

In step 66, the processor 20 processes the image frame and the three-dimensional data to detect an object in the image frame, using the image frame and the three-dimensional data. As will be discussed in greater detail below in connection with FIGS. 3A-8I, the detected object could include, but is not limited to, an interior wall, ceiling, floor, door, or window, as well as an exterior feature such as a wall, door, window, or roof feature. Of course, the system 10 could be utilized to detect other objects, such as cabinets, furniture, fixtures, items within a building, and/or exterior features such as patios, driveways, sidewalks, landscaping features, etc. Step 66 could be performed using any suitable computer vision algorithm capable to detecting features from 2D and 3D data, such as a convolutional neural network (CNN) or other type of machine learning and/or artificial intelligence algorithm capable to being trained to detect desired features in 2D and 3D data.

In step 68, the processor 20 determines the type of object detected. This could be accomplished using the algorithm discussed in step 66 above, with one or more classification functions being performed. For example, in the case of a CNN, the CNN could output a binary classifier indicating whether the object detected is, or is not, a door. Multiple such classifications could be performed such that the algorithm can classify various detected objects such as walls, ceilings, floors, doors, windows, exterior features, roof features, landscaping features, etc. In step 70, the processor 20 determines an augmented reality (AR) icon based on the type of object determined in step 68. For example, if step 68 determines that the detected object is a wall, in step 70, the processor 20 determines a suitable AR icon (e.g., a displayable user interface (UI) element that can be manipulated by the user, such as a UI widget or tool) corresponding to the wall. Of course, other AR icons can be identified in step 70 corresponding to other types of objects detected in step 68 (e.g., a door AR icon if a door is detected, a ceiling AR icon if a ceiling is detected, a floor AR icon if a floor is detected, a window AR icon if a window is detected, etc.).

In step 72, the processor 20 causes a display of the device 12 to display the image frame as well as the AR icon superimposed on the image frame. For example, if the image frame includes a wall, the image frame (including the wall) is displayed on the display of the device 12, with a wall AR icon superimposed on the wall in the image frame. The AR icon could be superimposed on a portion of the detected object displayed in the image frame, and/or it could be superimposed such that it appears over the entire object displayed in the image frame.

In step 74, the processor 20 detects user input (e.g., the user taking an action in a user interface displayed on the device 12, such as tapping and/or manipulating an icon) and determines whether user input has occurred. If a negative determination is made, control returns back to step 62 so that the foregoing processing steps can be repeated (e.g., in real time, such that a real-time image frame is displayed along with a suitable AR icon which could move in the display so that it tracks movement of the object in the image when the mobile device 12 is moved). If a positive determination is made, step 76 occurs, wherein the processor 20 determines whether the user input indicates that the user desires to capture the object. In such circumstances, the user had judged that the AR icon that is displayed superimposed on the object sufficiently represents the object, and that a model representation of the object should be created and added to a three-dimensional model. If so, step 78 occurs, wherein a model representation of the object is created by the processor 20 (e.g., a 3D plane corresponding to a detected wall is created) and added to a three-dimensional model created by the processor 20 and stored in the memory 30. Otherwise, step 76 occurs.

In step 80, a determination is made as to whether the user input indicates that the user wishes to adjust the displayed AR icon. For example, the user may wish to adjust the displayed AR icon so that it better corresponds to the object over which it is displayed on the screen, in order to ensure accurate modeling of the object. If a positive determination occurs, step 82 occurs, wherein the AR icon is adjusted based on user input (e.g., by the user repositioning the icon, changing its shape, etc.) and the adjusted AR icon is re-displayed superimposed over the object. Otherwise, step 84 occurs, wherein a determination is made as to whether the current model of the feature of interest (e.g., a model of a room interior, a building exterior, etc.) is complete. If a negative determination is made, control returns to step 62 so that additional objects can be detected and modeled in the manner described above. Otherwise, if a positive determination is made, step 86 occurs, wherein the processor 20 generates a complete model of the feature of interest, and processing ends. The complete model could be saved in the memory 30 of the device 12, and/or transmitted to another computer system and/or program for further processing thereby (e.g., to generate an estimate of the cost of materials corresponding to the modeled feature of interest, generate a report detailing the modeled feature of interest, etc.).

Figure 3A:
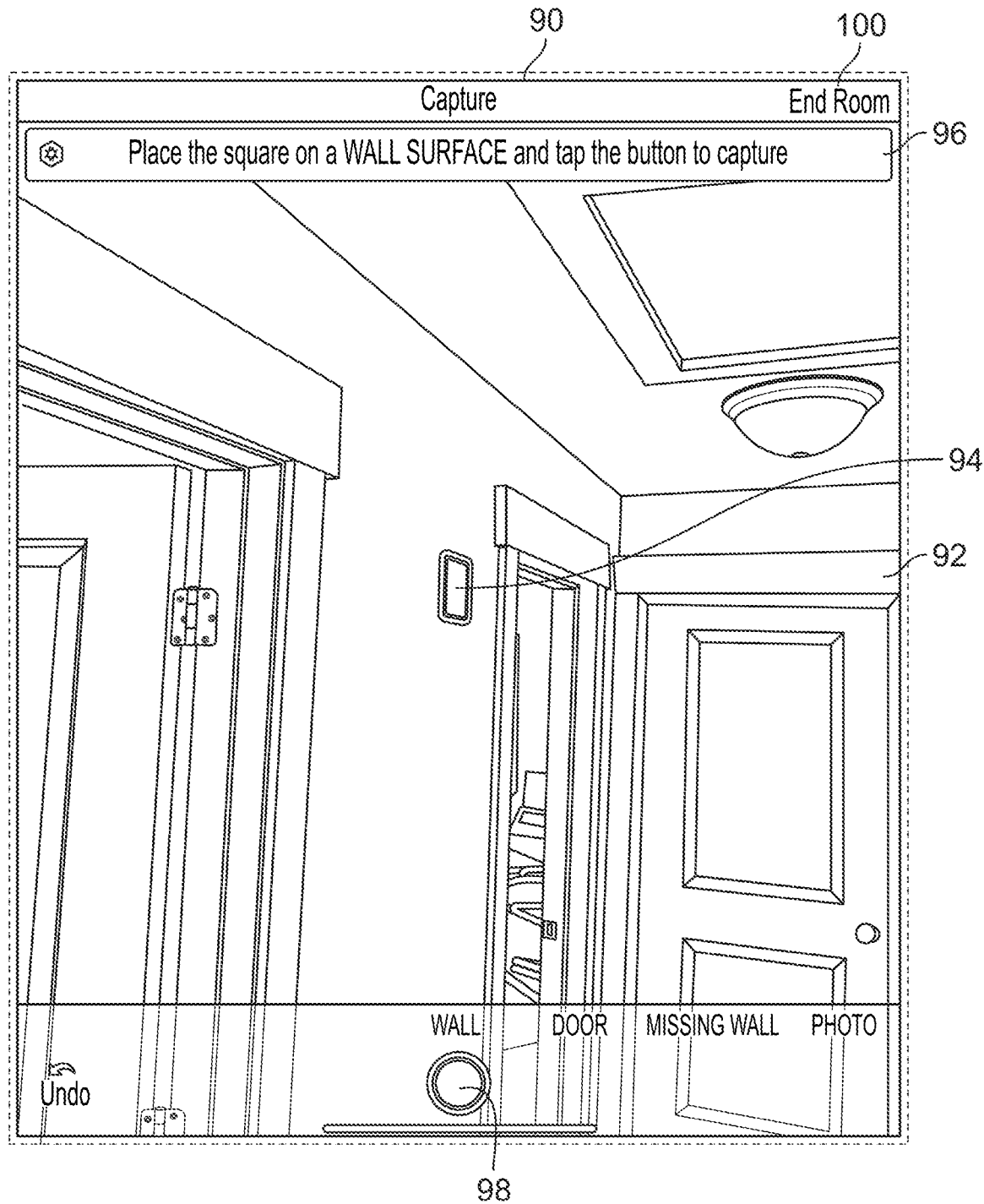
FIGS. 3A-3B are screenshots illustrating wall capture functions and associated wall capture user interface AR icons provided by the systems and methods of the present disclosure.
Figure 3B:
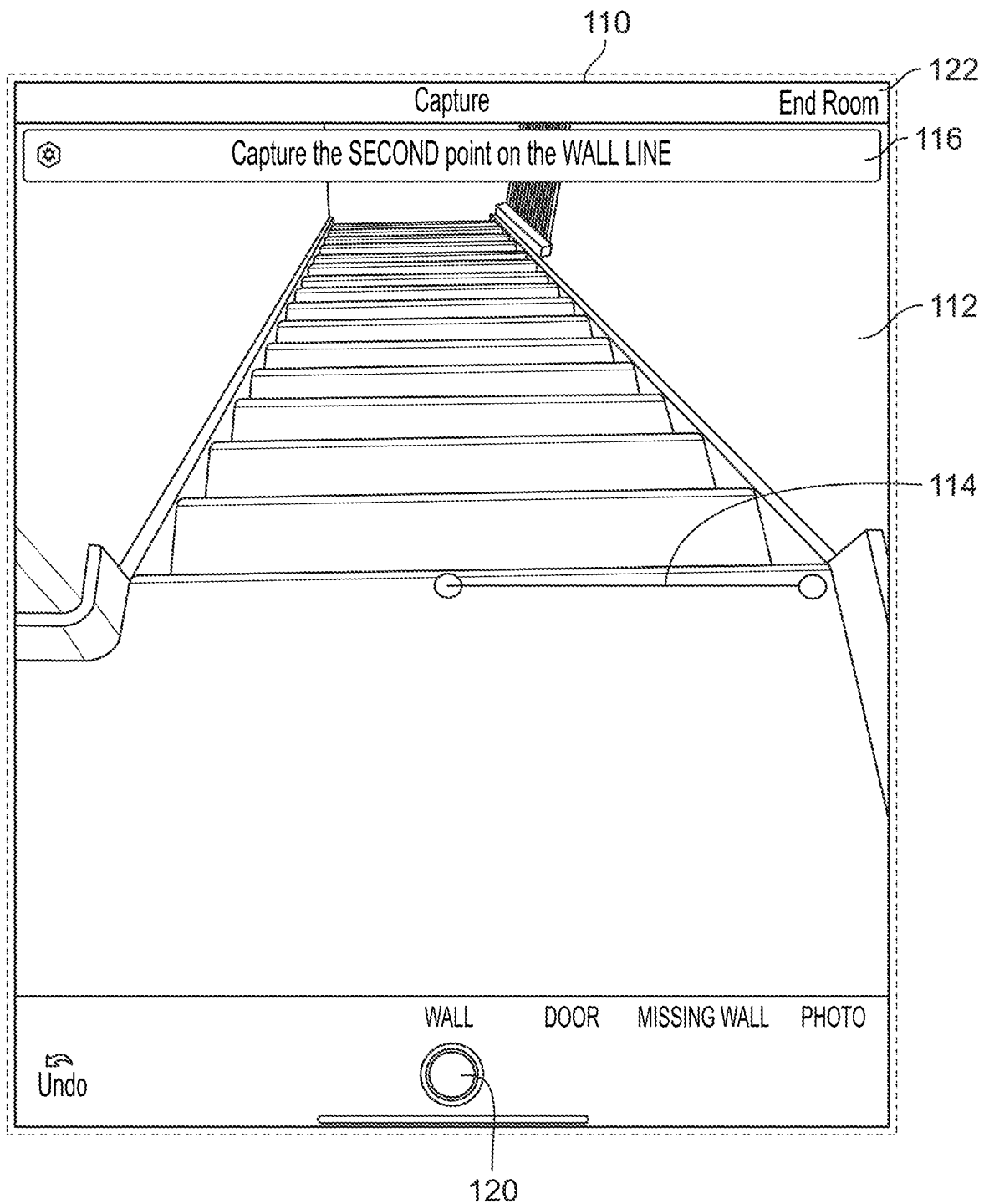

FIGS. 3A-3B are screenshots illustrating wall capture functions and associated wall capture user interface AR icons provided by the systems and methods of the present disclosure. As can be seen in FIG. 3A, when the device 12 is pointed to a wall of interest (to be modeled), a user interface screen 90 is displayed to the user, which includes an image frame 92 that includes a wall of interest (captured using the camera 40 of the device 12) and a wall AR icon 94 that can be manually or automatically positioned superimposed on the wall of interest. A prompt bar 96 requests that the user place the wall AR icon 94 on the wall of interest (in the event that the AR icon 94 is not automatically positioned on the wall of interest, or if the AR icon 94 requires repositioning in order to more accurately align with the wall of interest), and to actuate (e.g., tap) the capture button 98 when the AR icon 94 is accurately positioned on the wall of interest. Additionally, as can be seen in FIG. 3A, the user can switch to different AR icons for different types of objects (as will be described below) by sliding a slider bar positioned above the capture button 98 (e.g., the user can switch between a wall AR icon, a door AR icon, a missing wall AR icon, or engage a photo mode wherein photographs can be taken, if desired).

Alternatively and additionally, as illustrated in FIG. 3B, a different wall capture AR tool could be provided for capturing walls. As shown in the user interface screen 110, a line capture AR tool 114 is displayed superimposed on an image frame 112 and can positioned at a location in the image frame 112 where no wall currently exists, but the user wishes to create a model of a dividing wall at that location. Examples of where such functionality may be useful include "great rooms" that include kitchen, dining, and family areas that are open to each other, but the user desires to separately capture and model such areas. When the device 12 is pointed to a floor or a ceiling, the AR tool 114 is displayed as a dot. Using the AR tool 114, the user can create a line where rooms should be separated by capturing two dots anywhere along that line (whereupon the AR tool 114 illustrates the line as shown in FIG. 3B). A prompt bar 116 provides instructions to the user as to how to utilize the AR tool 114. When the wall has been captured, the user can actuate the capture button 120, which causes the wall to be added to the model being created. Additionally, when capturing of a room is complete, the user can tap the "end room" button 122, which causes a model of the room to be created based on the captured information delineated by the AR tool 114.

Figure 4:
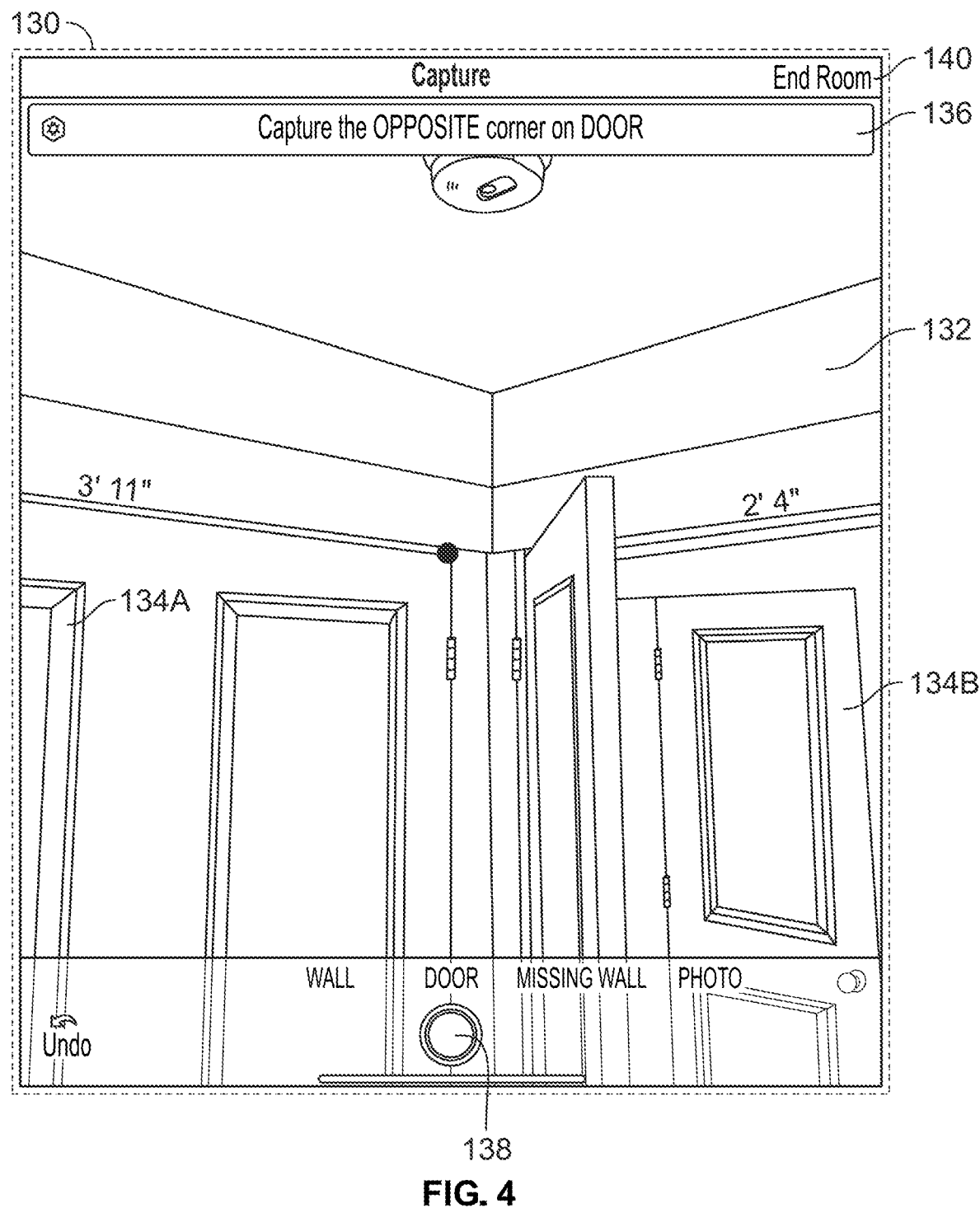
FIG. 4 is a screenshot illustrating door capture functions and associated door capture user interface AR icons provided by the systems and methods of the present disclosure.

FIG. 4 is a screenshot illustrating door capture functions and associated door capture user interface AR icons provided by the systems and methods of the present disclosure. As can be seen, the user interface screen 130 displays an image frame 132 that includes one or more doors to be modeled, as well as one or more door AR icons 134A-134B superimposed over the one or more doors. The AR icons 134A-134B allow the user to identify one or more doors to be modeled, and can be manipulated to define the doors. For example, each of the AR icons 134A-134B could initially be displayed in the center of the screen 130 as a dot which could be aligned with one corner of a door, whereupon the user selects the corner as a starting corner by pressing a selection button. The starting corner can be one of the corners on the top or bottom of the door, if desired. The device 12 could then be moved such that the dot is aligned with a corner opposite (diagonally) the starting corner. A rectangle is then displayed on the screen (superimposed on the door), indicating the area that will be captured as a door. The capture button 138 can be actuated when the door has been marked, and the door could then be captured for subsequent inclusion in a model. As with the user interface screens discussed herein, a prompt bar 136 could provide instructions to the user as to how to capture the door, and when the door has been captured, the user can actuate the "End Room" button 140 in order to end modeling of a room (e.g., when the door has been adequately captured). As can be seen in FIG. 4, various indicia indicating measurements of the door (or other feature) could be displayed next to the AR icon, if desired. Additionally, the AR icons 134A-134B could automatically "snap" (change shapes/sizes) to match a door height and/or width (e.g., to automatically delineate common door sizes). Further, the system could automatically identify the sizes and positions of doors, if desired.

Figure 5:
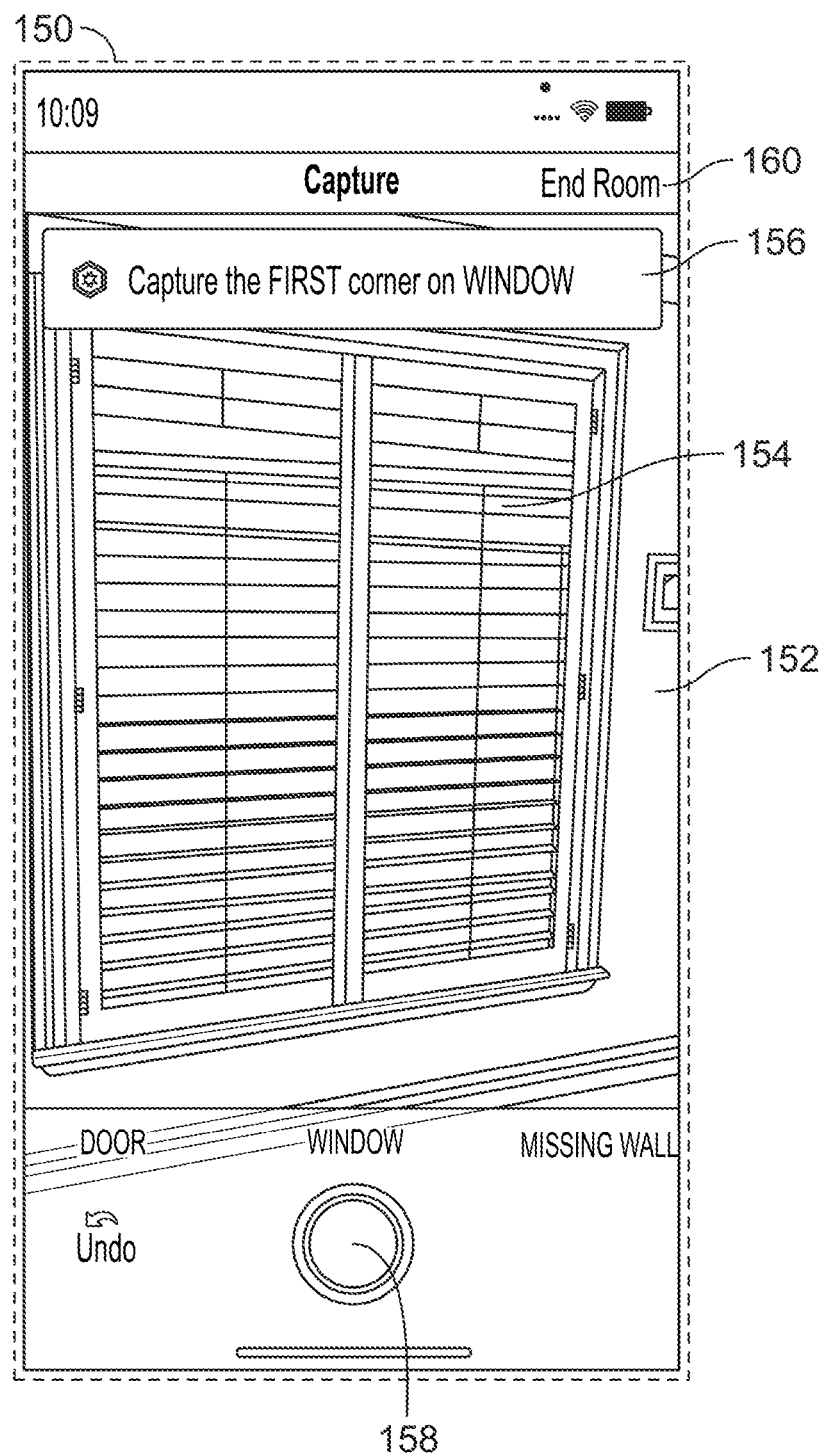
FIG. 5 is a screenshot illustrating window capture functions and associated window capture user interface AR icons provided by the systems and methods of the present disclosure.

FIG. 5 is a screenshot illustrating window capture functions and associated window capture user interface AR icons provided by the systems and methods of the present disclosure. Specifically, as shown in FIG. 5, the user interface screen 150 displays in image frame 152 that includes a window to be captured, and a window AR icon 154 displayed superimposed on the window. The window AR icon 154 can be manipulated by the user to match the shape of the window. For example, the user can mark two opposite corners of the window, which cause the window AR icon 154 to match the shape of the window to be captured. Further, the AR icon 154 could automatically identify the size and position of the window, if desired. When the AR icon 154 matches the shape of the window, the user can actuate the capture button 158 in order to capture the window and add it to a model. As with the other screens described herein, a prompt bar 156 is provided for instructing the user on how to manipulate the AR icon 154, and an "End Room" button 160 is provided and can be actuated when capturing of features of a room are complete, so that the features can be added to the model.

Figure 6:
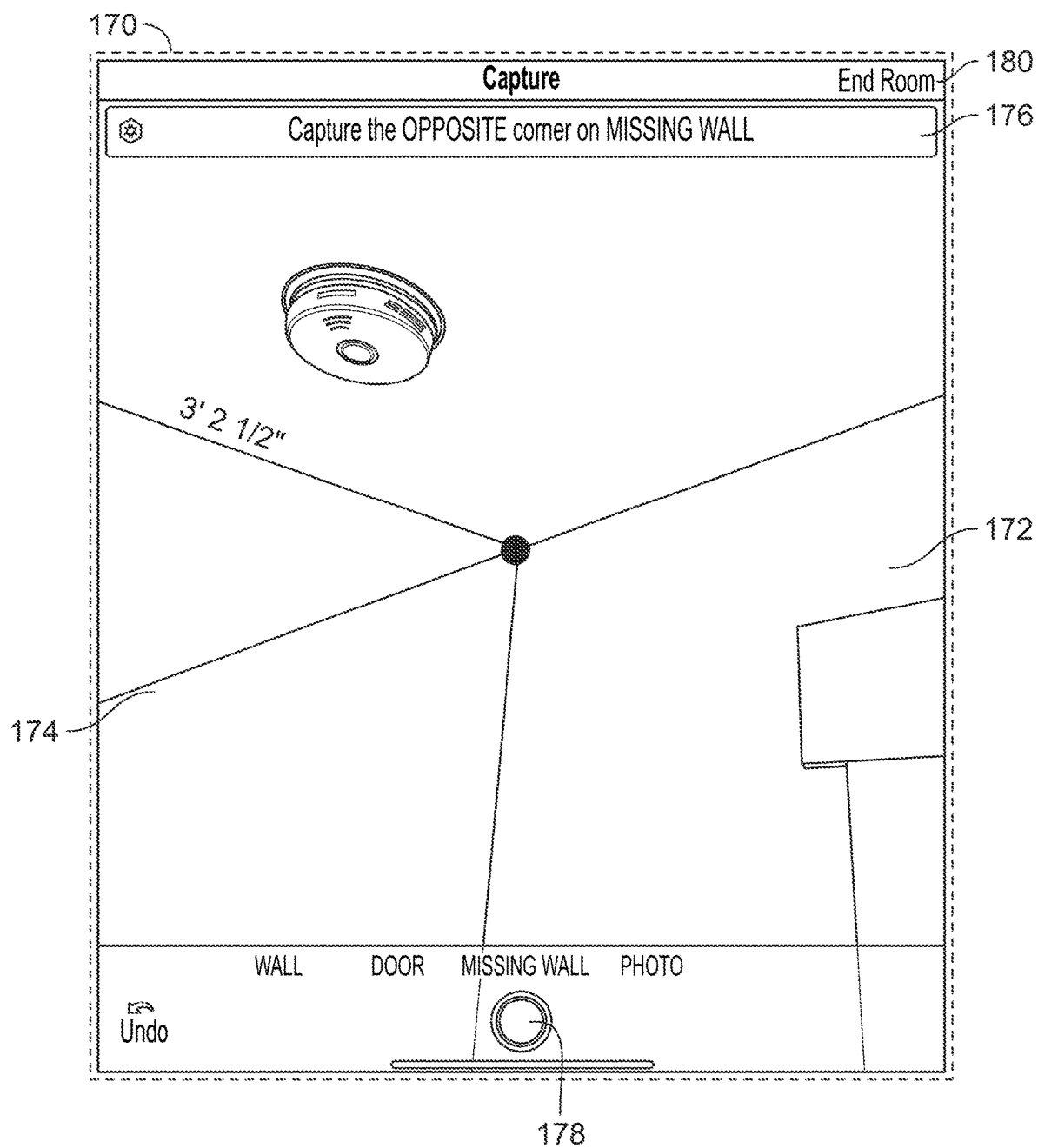
FIG. 6 is a screenshot illustrating missing wall capture functions and associated missing wall capture user interface AR icons provided by the systems and methods of the present disclosure.

FIG. 6 is a screenshot illustrating missing wall capture functions and associated missing wall capture user interface AR icons provided by the systems and methods of the present disclosure. As can be seen, the user interface screen 170 displays an image frame 172 and a missing wall AR tool 174 superimposed on the image frame 172. The missing wall AR tool 174 allows a user to define an opening in a wall for a model of a structure that is not a door or a window. This can be accomplished by using the AR tool 174 to define two opposite corner points (in the same manner as the door and window AR tools discussed above), whereupon the AR tool 174 defines a rectangular opening, or missing wall, that can be added to a model. A prompt bar 176 guides the user as to how to utilize the AR tool 174. When the missing wall has been defined using the AR tool 174, the user can actuate the capture button 178, whereupon the missing wall is added to a model. As with the other screens described herein, a prompt bar 176 is provided for instructing the user on how to manipulate the AR tool 174, and an "End Room" button 180 is provided and can be actuated when capturing of features of a room are complete, so that the features can be added to the model.

Figure 7A:
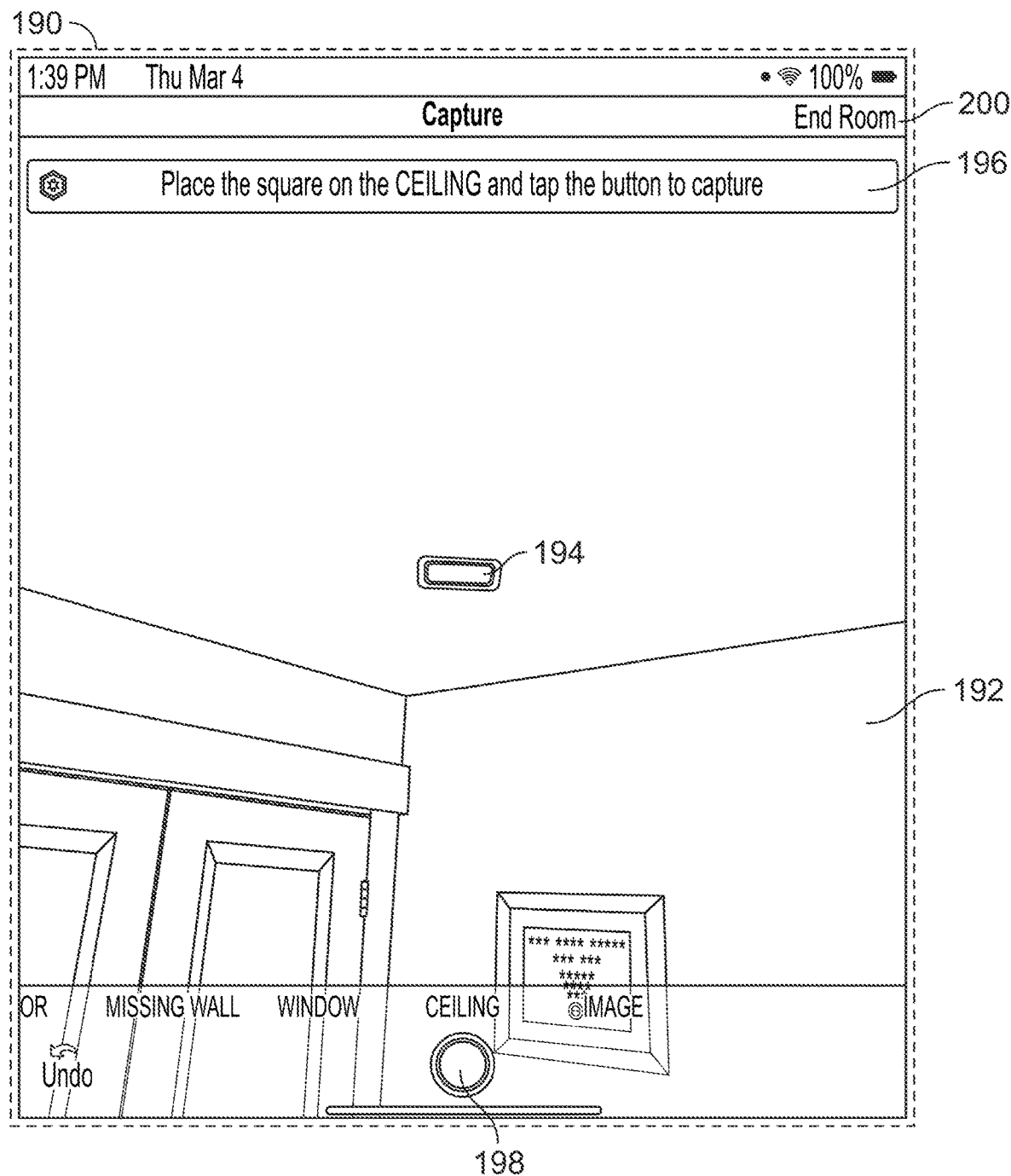
FIGS. 7A-7C are screenshots illustrating ceiling and floor capture functions and associated ceiling and wall capture user interface AR icons provided by the systems and methods of the present disclosure.
Figure 7B:
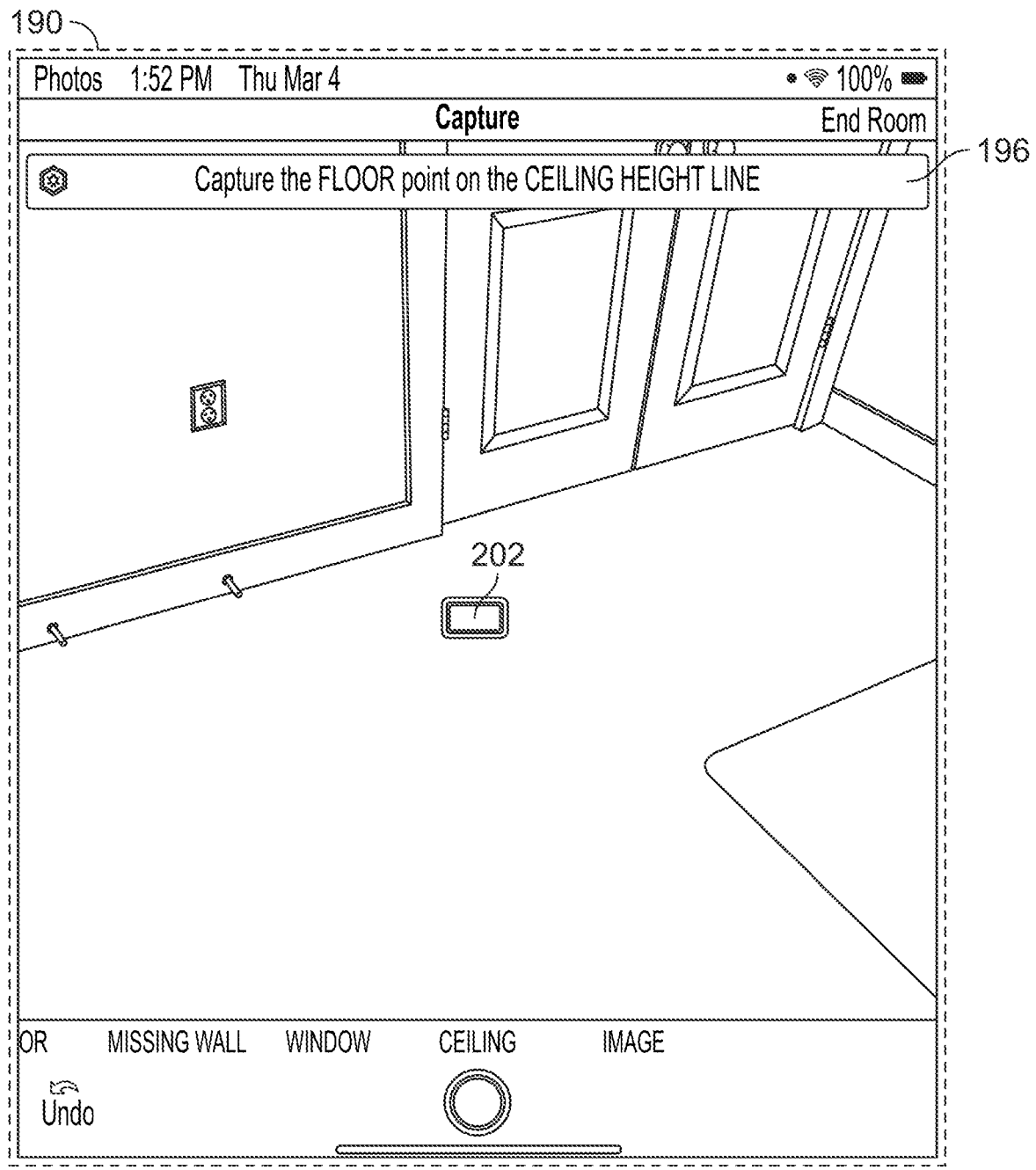
Figure 7C:
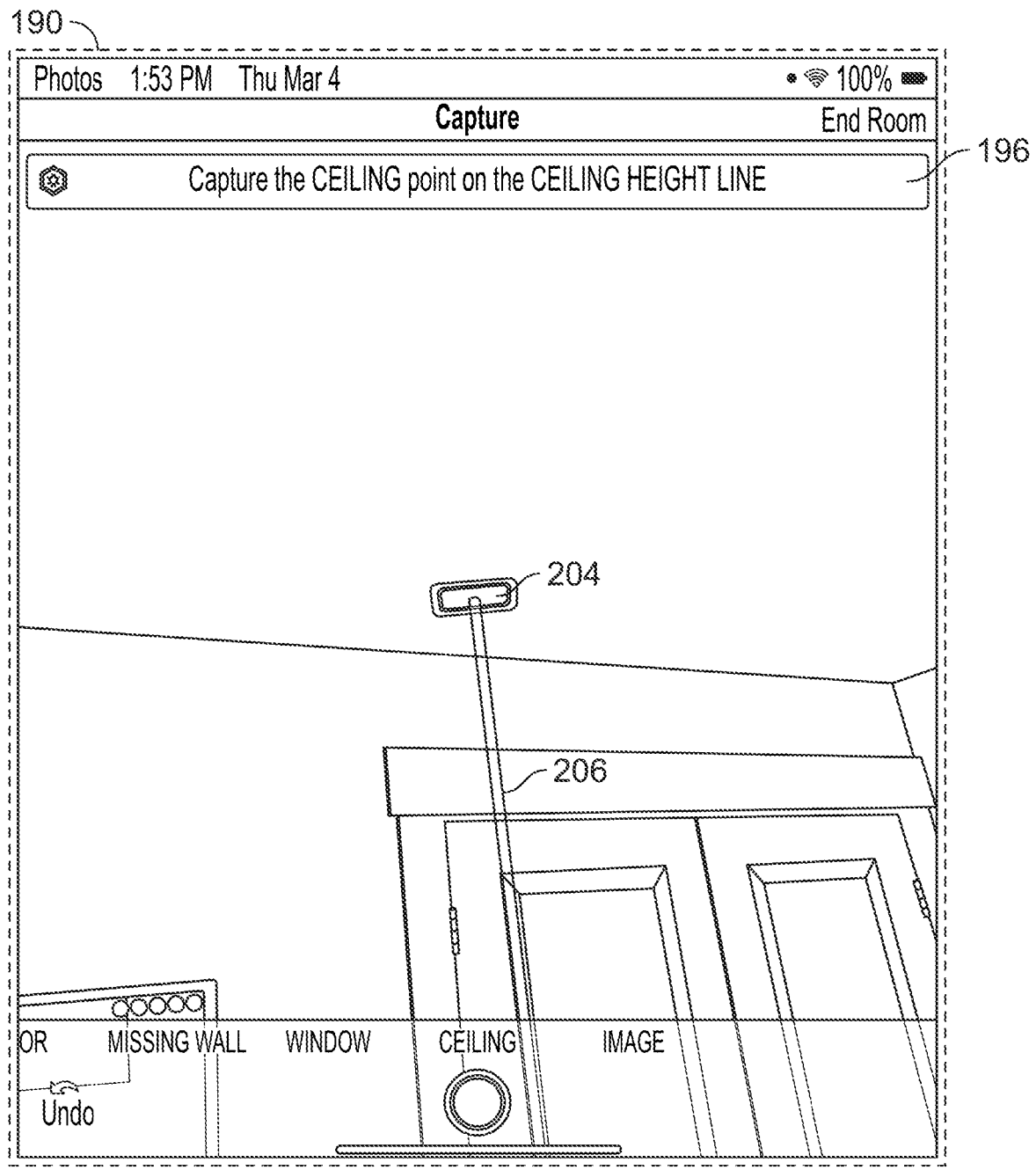

FIGS. 7A-7C are screenshots illustrating ceiling and floor capture functions and associated ceiling and wall capture user interface AR icons provided by the systems and methods of the present disclosure. As shown in FIG. 7A, the user interface screen 190 displays an image frame 192 that includes an image of a ceiling to be modeled, and a ceiling AR tool 194 superimposed on the image frame 192. The AR tool 194 can be re-positioned by the user as desired, to more accurately align with a ceiling to be modeled. A prompt bar 196 provides instructions as to how to utilize the AR tool 194. When the AR tool 194 correctly aligns with the ceiling shown in the image frame 192, the user can actuate the capture button 198, whereupon the ceiling is added to a model. The "End Room" button 200 can be actuated once all desired features have been captured, to generate a model of a room.

Alternatively and additionally, ceilings can be modeled using a different AR tool shown in FIGS. 7B-7C. As shown in FIG. 7B, the user interface screen 190 displays a floor AR tool 202 superimposed on the floor of a room shown in an image frame, when the device 12 is pointed at the floor of a room. The AR tool 202 can be aligned as desired, and once aligned, the user can actuate a selection button to mark a point on the floor. Then, as shown in FIG. 7C, the user can point the device 12 to the ceiling of the same room, whereupon a ceiling AR tool 204 appears in the display superimposed on the ceiling shown in the image frame. Additionally, a vertical AR tool 206 is displayed, interconnecting the ceiling AR tool 204 with the floor AR tool 202. When the ceiling AR tool 204 is properly positioned, the user can actuate a selection button, which causes the device 12 to calculate a ceiling height based on the positions of the floor AR tool 202 and the ceiling AR tool 204.

Figure 8A:
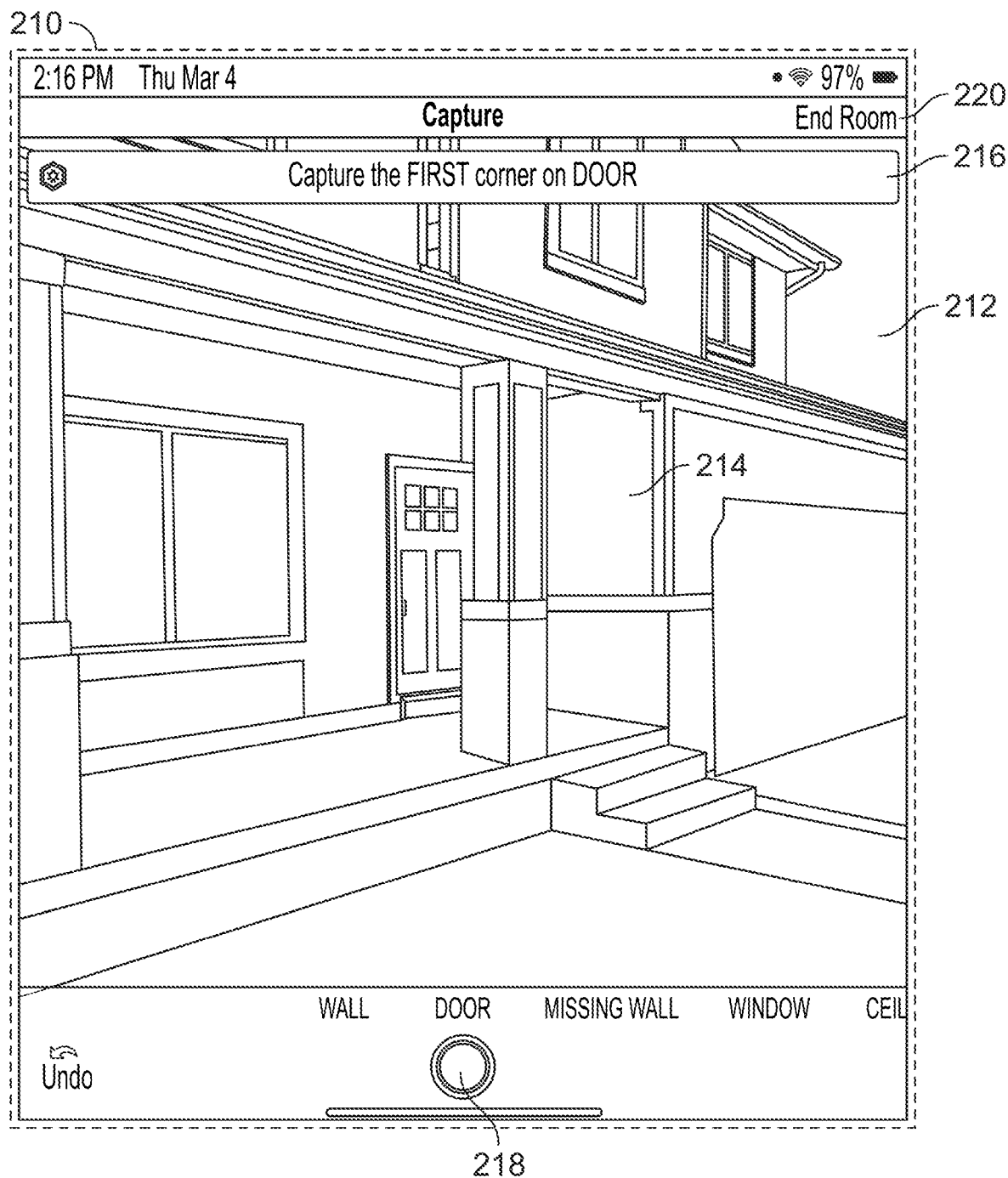
FIGS. 8A-8I are screenshots illustrating exterior feature capture functions and associated exterior feature capture user interface AR icons provided by the systems and methods of the present disclosure.

FIGS. 8A-8I are screenshots illustrating exterior feature capture functions and associated exterior feature capture user interface AR icons provided by the systems and methods of the present disclosure. It is noted that all of the AR tools and associated functions discussed above with capturing of interior features could also be used to capture exterior building features. As shown in FIG. 8A, a user interface screen 210 displays an image frame 212 including an image of one or more exterior features to be modeled, and one or more AR icons 214 displayed superimposed on the image 212. The one or more AR icons 214 could correspond to any of the AR icons discussed above, as well as additional icons discussed herein below. When desired exterior features have been captured, the user can actuate a capture button 218 which causes the features to be added to a model. A prompt bar 216 provides the user with instructions on how to operate the one or more AR icons 214, and the user can actuate the "End Room" button when all desired exterior features have been captured, in order to generate a model of the exterior of the building. The tools described in FIGS. 8A-8I can be used to capture exterior walls, doors, windows, building footprints, exterior wall heights, and other features.

Figure 8B:
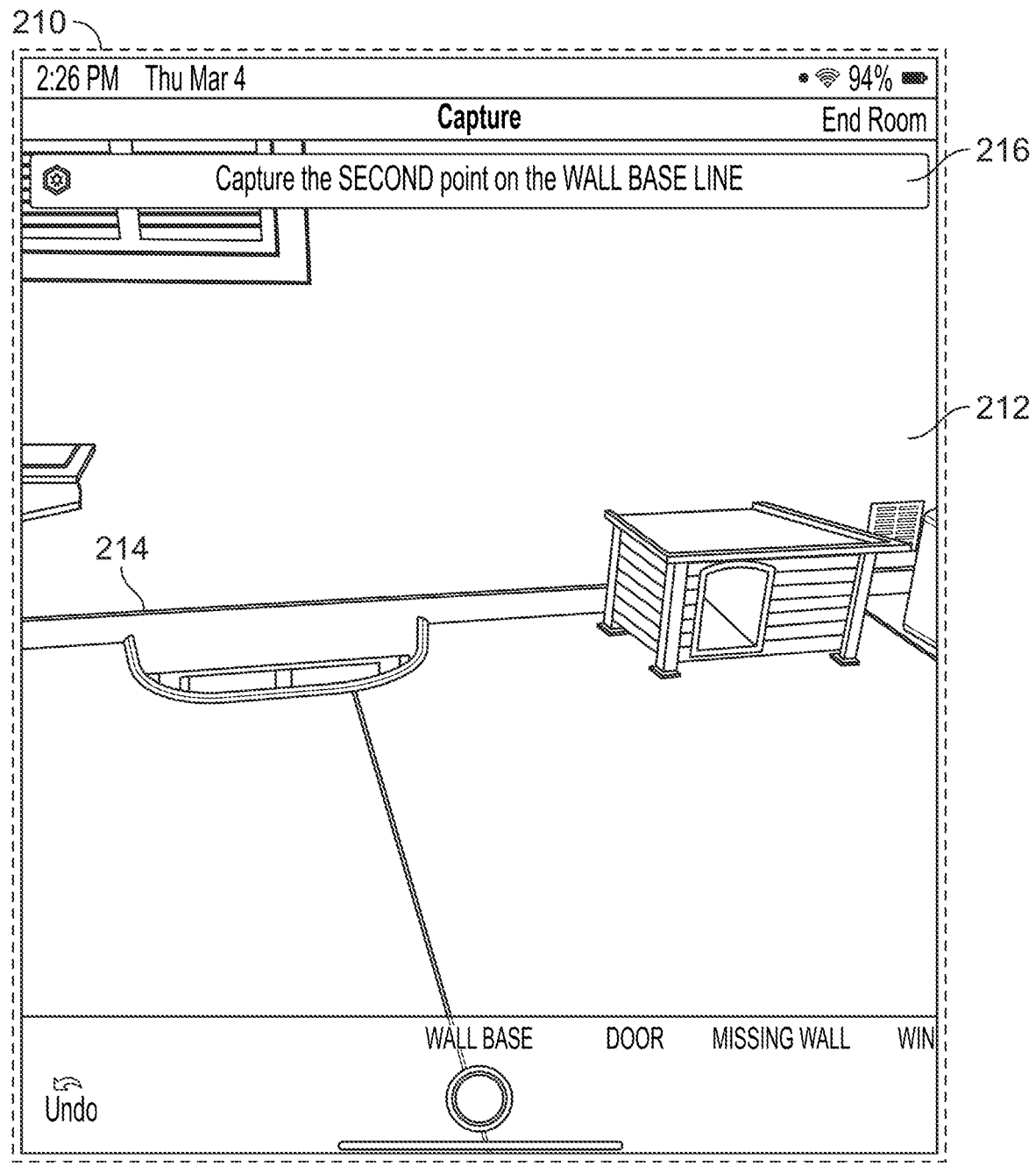

As shown in FIG. 8B, the AR icon 214 could allow a user to define points along a wall base of the exterior of a building, and could function in a manner similar to the wall AR tool 114 discussed above in connection with FIG. 3B. The tool 214 could be aligned with the base of an exterior wall and used to mark the base (typically, at the top of the foundation of the structure). Other features, such as the ground, could also be marked using the tool 214. A default base elevation could be defined using the tool 214, as well as a bottom horizontal line for capturing exterior walls (described below). Advantageously, the tool 214 allows the user to capture walls on a stepped foundation, as well as standard walls.

Figure 8C:
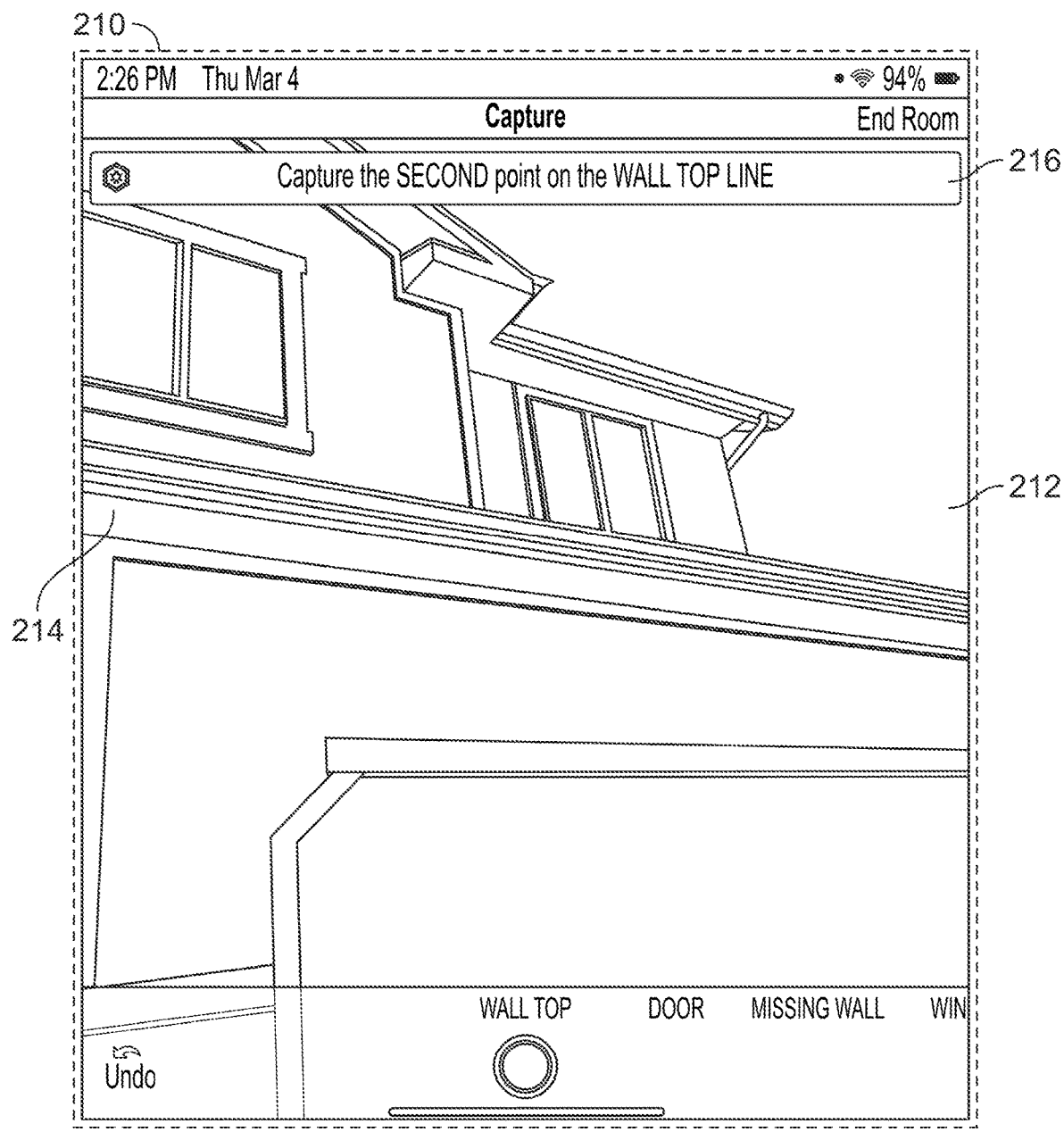

As shown in FIG. 8C, the tool 214 could also allow for marking and capturing of wall top lines, for indicating the tops of exterior walls. As the tool 214 is moved from point to point along the top of a wall, a line is indicated to the user. The user aligns the line with the top line of the wall and marks a second point. The ends points of the line do not need to be positioned at the ends of the wall, and could be positioned at any point along the wall top. The corresponding wall is then adjusted to match the captured line. This allows the user to capture gable end walls (triangular in shape) was well as standard walls (rectangular in shape).

Figure 8D:
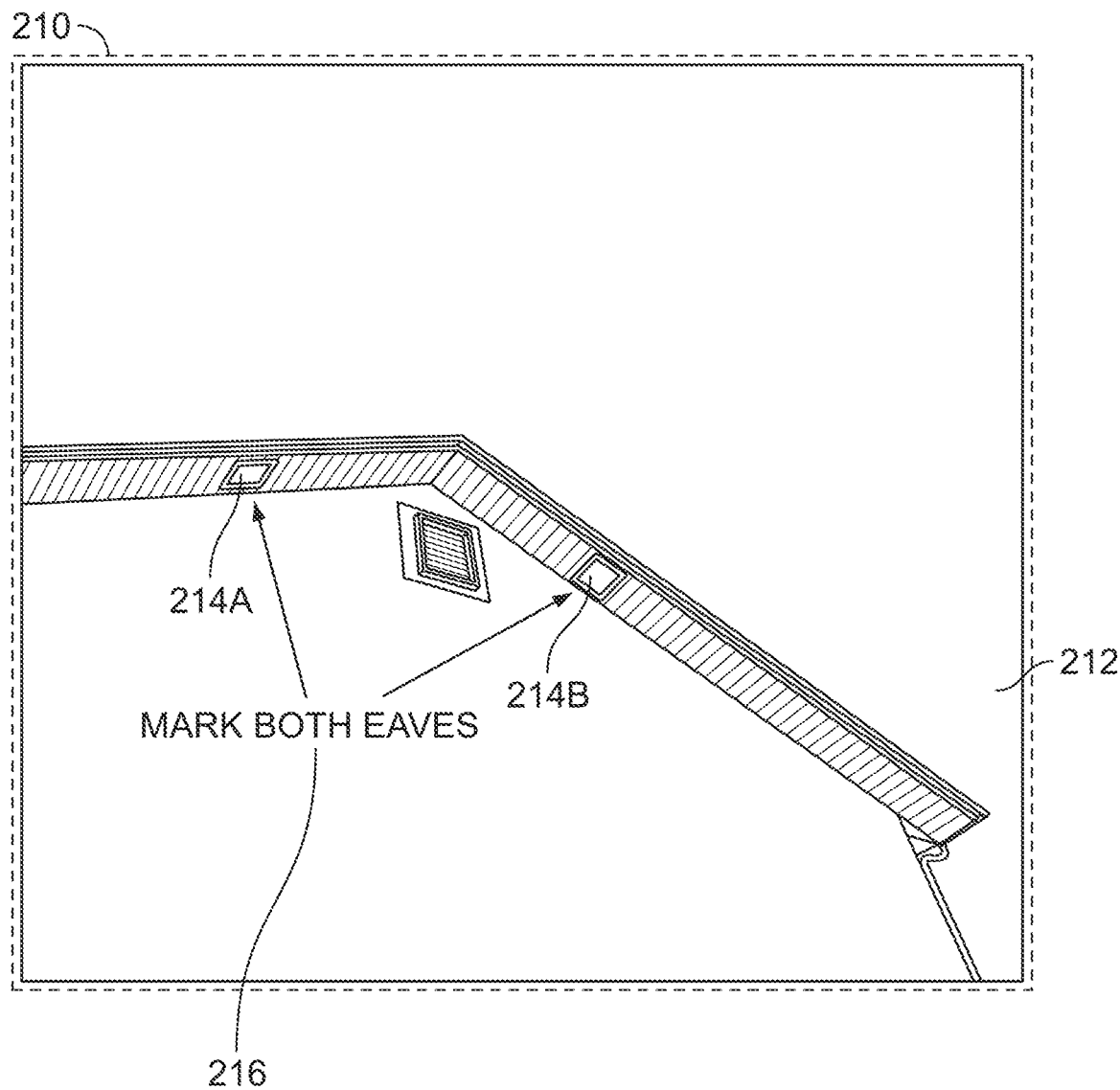
Figure 8E:
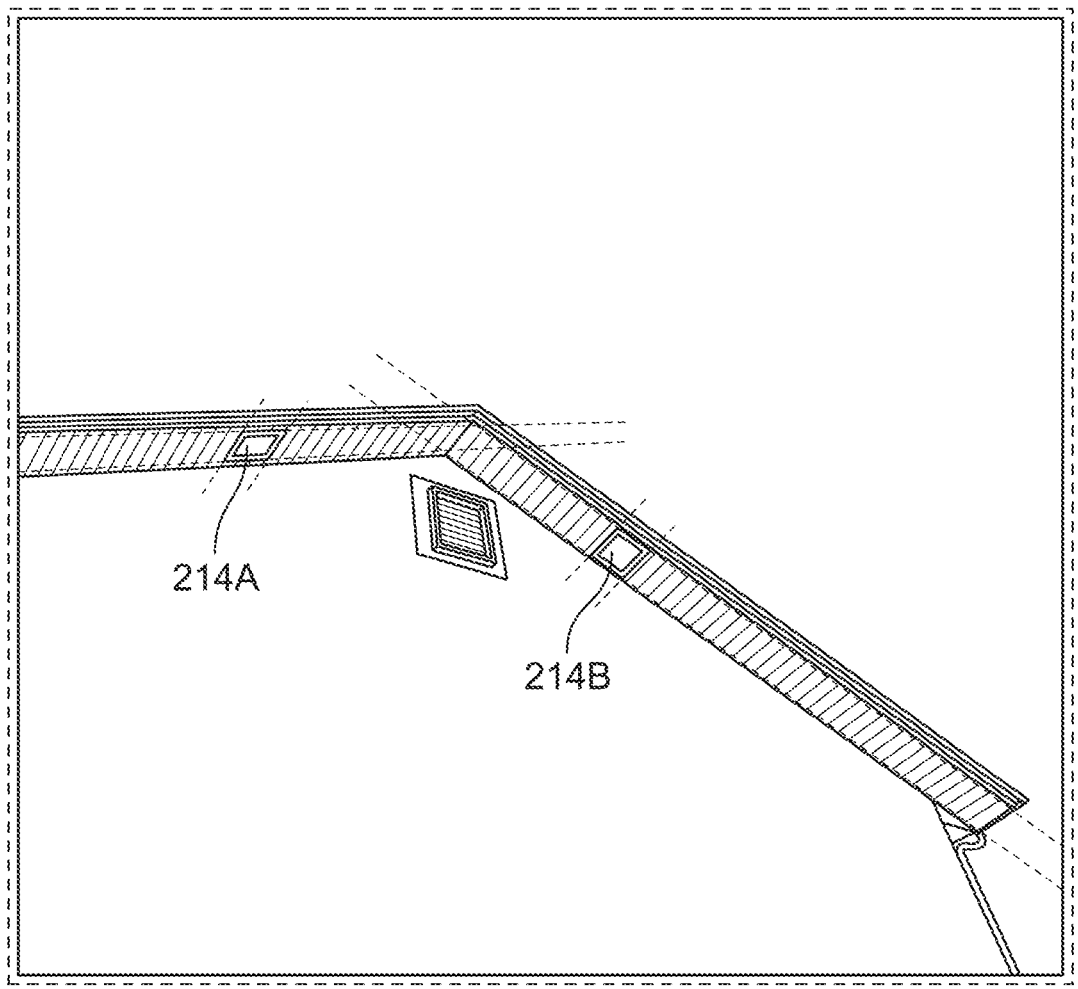

As shown in FIG. 8D, the tool 214 could be utilized to mark the tops of walls near roof features. To do so, the tool 214 could be split into two or more soffit AR tools 214A-214B, which could be positioned so that they are superimposed over the eaves of the roof. A prompt 216 could prompt the user to mark the eaves by positioning the AR tools 214A-214B on the eaves, and then actuating a selection button. As shown in FIG. 8E, once the eaves have been marked, the tools 214A-214B could project marker lines to assist with lining the tools 214A-214B with the tops of the walls in the image frame. Once aligned, the user can actuate a capture button to mark the wall tops.

Figure 8F:
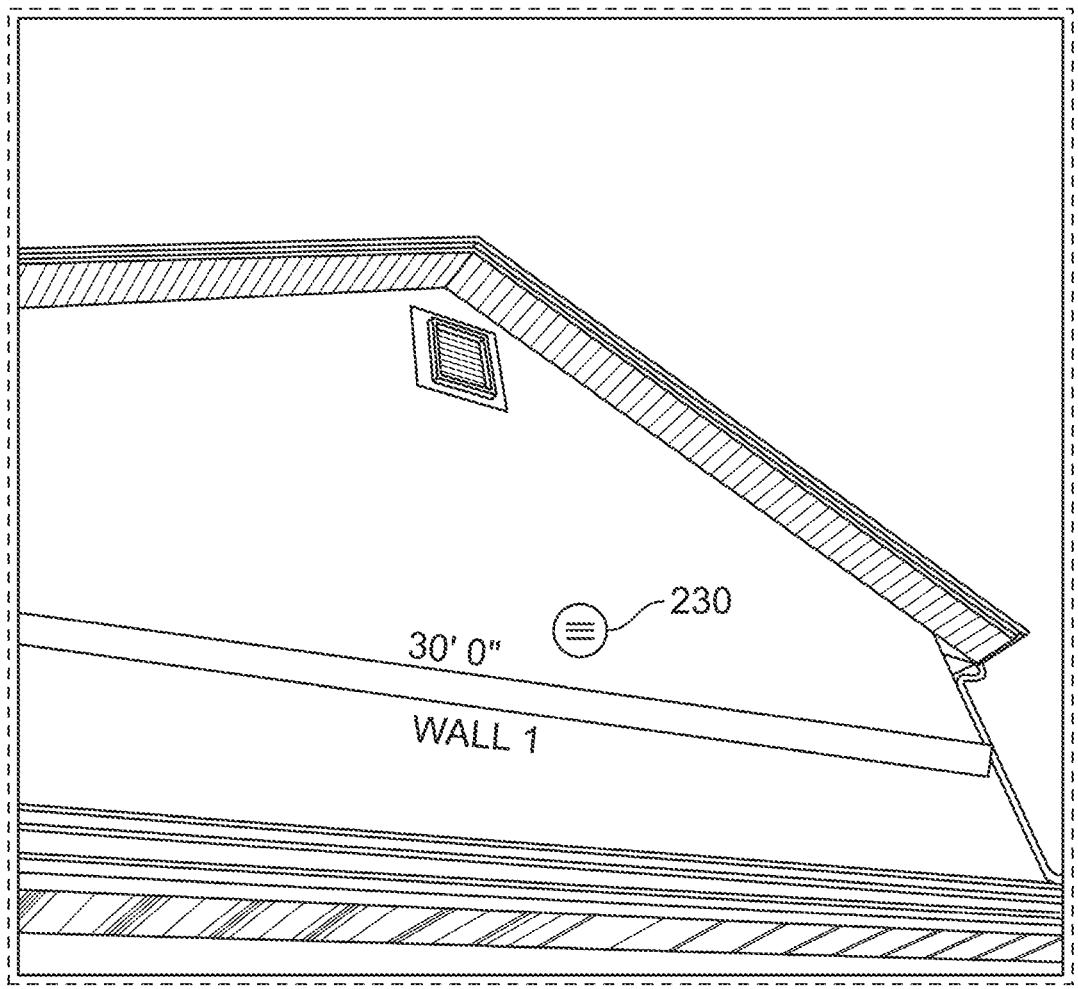

It is noted that information about walls captured by the system could be utilized to automatically construct roof features. Such a feature is helpful in circumstances where the three-dimensional sensor 40 is not capable of detecting three-dimensional data corresponding to roof features (e.g., the sensor is not sensitive enough, or the roof features are not within range of the sensors). As shown in FIG. 8F, a selection indicator 230 is displayed on the screen, and the user can be prompted to identify the type of wall that appears in the screen, such as a gable wall (triangle shape) or an eve wall (rectangle shape). Once the wall type is identified, the system can automatically create the roof structure above the walls based on the identified wall types. For example, a roof plane could be constructed by the system at the top of each identified eave wall, and could be offset from the wall to allow for overhangs. The slope could be calculated from adjacent gable walls that have been identified. If the adjacent walls are not gable walls, a default slope could be utilized or the user could specify a slope value.

Figure 8G:
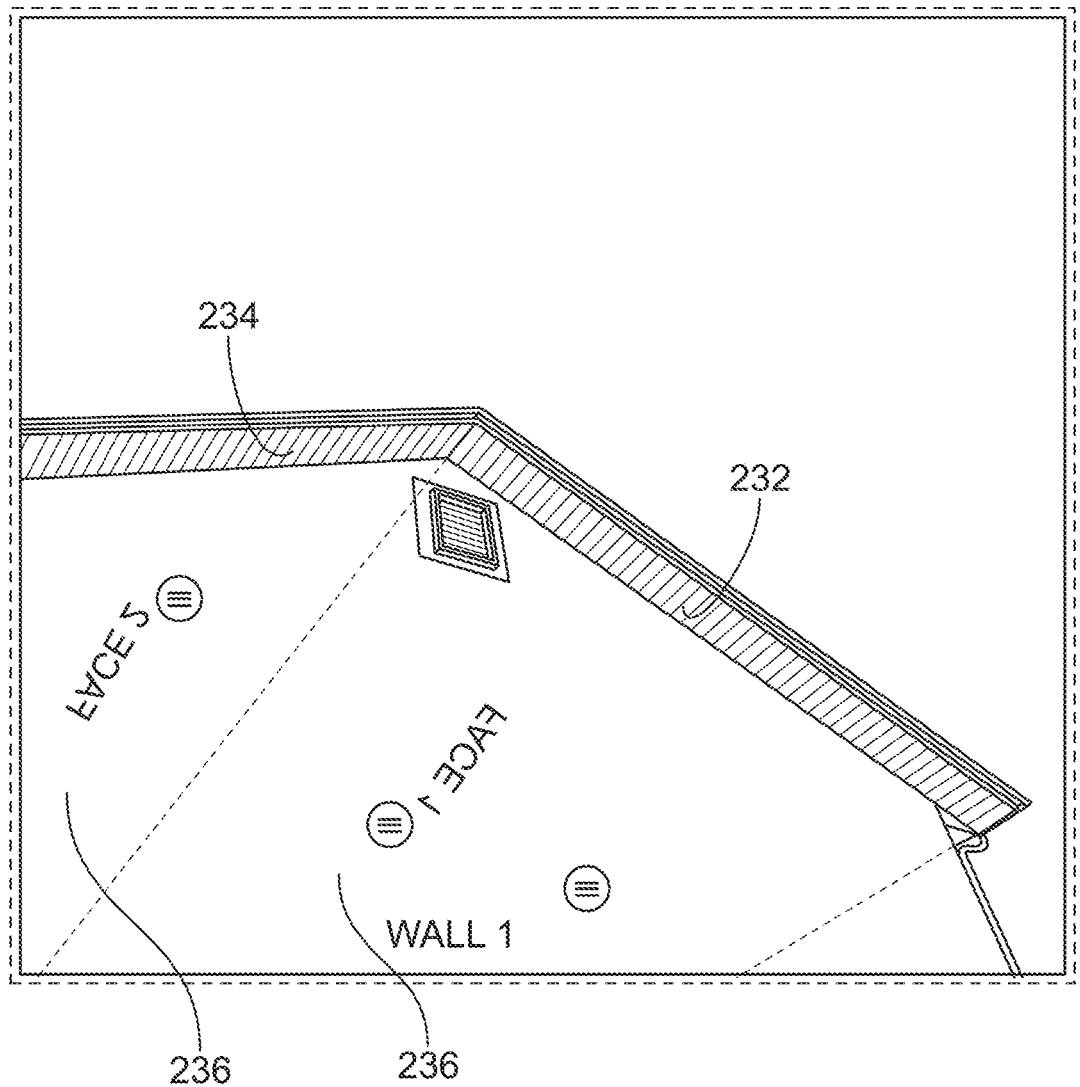

As shown in FIG. 8G, each of the roof planes (indicated at 232 and 234) could be intersected with one another to form closed polyhedrons 236 in combination with the walls. The "straight skeleton" methods described in U.S. Pat. No. 10,127,670 to Lewis, et al., the entire disclosure of which is expressly incorporated herein by reference, could be utilized to form the polyhedrons 236, as well as constructive solid geometry (CSG) methods.

Figure 8H:
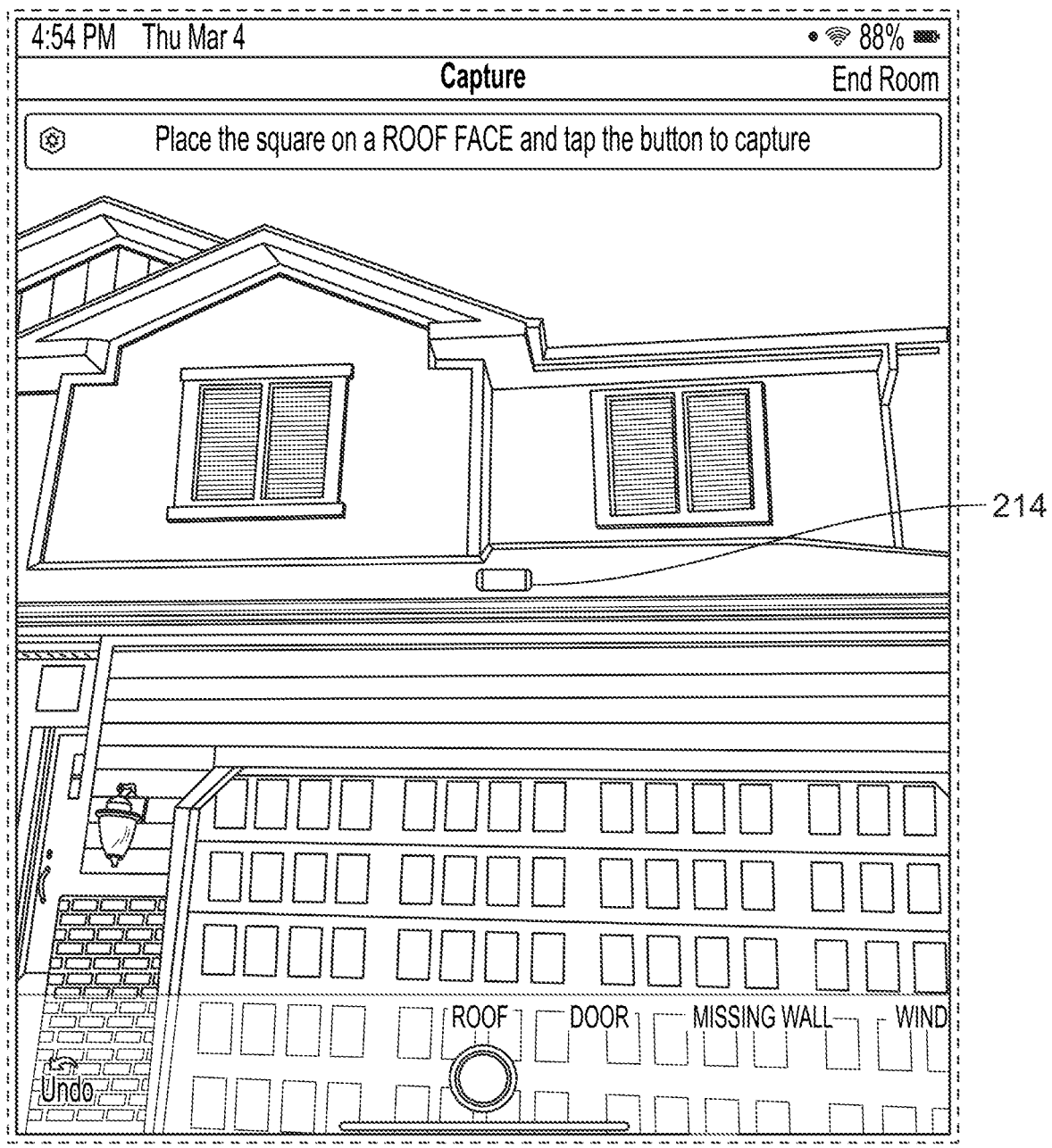
Figure 8I:
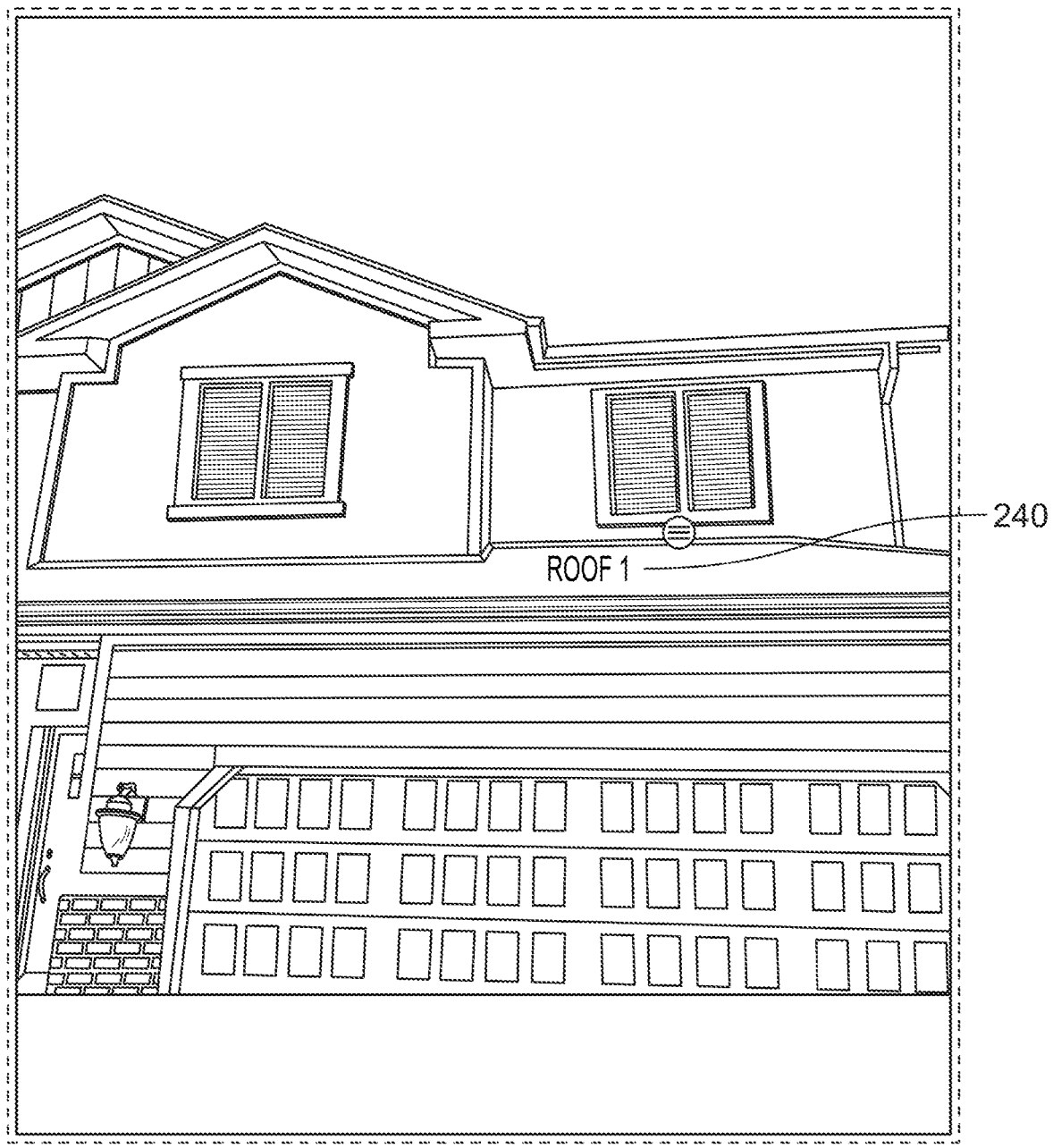

As shown in FIG. 8H, the tool 214 could also allow a user to define one or more roof features of a building by selecting roof faces and to make slope adjustments as needed. The slope could be set manually (the user manually measures and enters the slope), or by placing the tool 214 on the desired roof surface and actuating capture button (similar to capturing walls or ceilings as discussed above). As shown in FIG. 8I, the roof surface could be delineated by a marker 240 superimposed over the roof surface.

Figure 9:
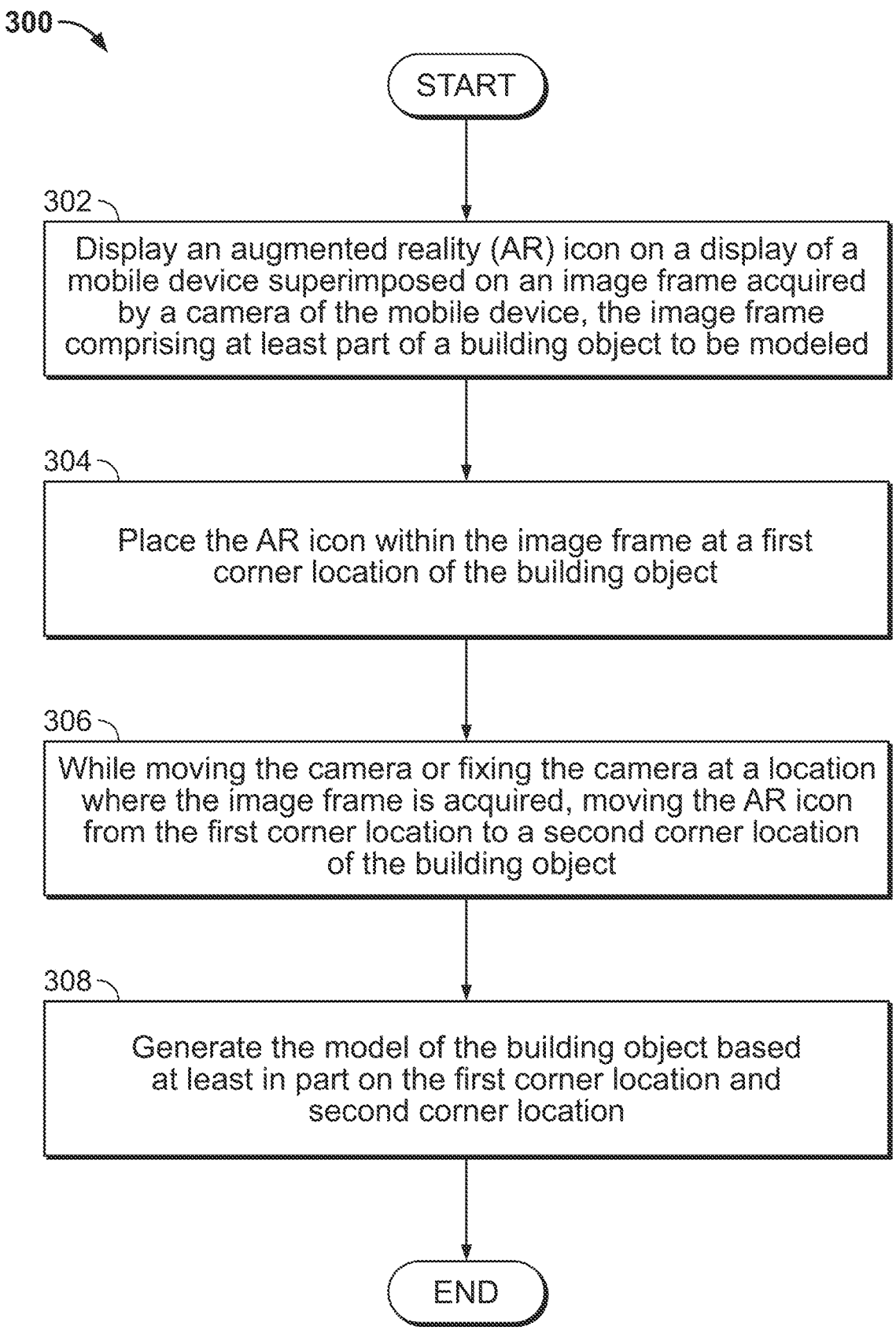
FIG. 9 is a flowchart illustrating additional processing steps carried out by the systems and methods of the present disclosure.

FIG. 9 is a flowchart illustrating additional processing steps 300 carried out by the systems and methods of the present disclosure. The steps 300 can be embodied as the code 32 stored on the memory 30 of FIG. 1, and can be executed by the processor 20 of the mobile device 12 of the system 10. Beginning in step 302, the system 10 displays an AR icon on a display of a mobile device superimposed on an image frame acquired by a camera of the mobile device. The image frame includes at least part of a building object to be modeled. For example, a building object can have a complicated structure, e.g., a stair, a cabinet, or the like. The AR icon can be a dot, a line, a crosshair, a line assembly, or the like. Examples are described with respect to FIGS. 10A-10E and 11A-11D In step 304, the user places the AR icon within the image frame at a first corner location of the building object. For example, the user can manually place the AR icon at a corner of a bottom or top of a stair where a rise meets a floor and a wall. Additionally and/or alternatively, the system 10 can automatically identify a corner of a bottom or a top of a stair and place the AR icon at the corner. An example with respect to a stair capture is further described with respect to FIGS. 10A and 10C. In another example, the user can manually place the AR icon to an opposite diagonal corner location of a face of a cabinet relative to a target location where the AR icon is previously placed at the face or at an edge of the cabinet. An example with respect to a cabinet capture is further described with respect to FIGS. 11A, 11B, 12A and 12B.

In step 306, while moving the camera or positioning the camera at a location where the image frame is acquired, the system 10 moves the AR icon from the first corner location to a second corner location of the building object. For example, the user can manually move the AR icon to an opposite end of the stair along a width of a bottom or a top of a stair, keeping the AR icon in an intersection of a floor and a riser. Additionally and/or alternatively, the system 10 can automatically identify an edge of a bottom or a top of a stair and place the AR icon at the opposite end of the stair. Examples with respect to a stair capture is further described with respect to FIGS. 10B and 10D. In another example, the user can manually move the AR icon from the first corner location to an opposite diagonal corner location of a face of the cabinet relative to the first corner location. Examples with respect to a cabinet capture is further described with respect to FIGS. 11C and 12C.

In step 308, the system 10 generates the model of the building object based at least in part on the first corner location and second corner location. For example, the system 10 can determine three-dimensional data for the first corner location and second corner location using the three-dimensional sensor. The system 10 can calculate a width of a top portion of the stair, a width of a bottom portion of the stair, a length of the stair, and a high rise of the stair based on the three-dimensional data. The system 10 can also automatically determine the number of risers of the stair and the number of treads, a width of a riser, a height of a riser, a width of a tread, and a depth of a tread based on the three-dimensional data in a combination with predetermined data (e.g., data derived from a uniform building code or data from standard stairs) or based on computer vision methods (e.g., a plane and surface detection to identify either the plane and/or surface polygon for either the riser or the tread, or using an edge neural network to count the number of risers or threads). Accordingly, the AR tools can simplify the stair capture process to capture only the minimum necessary elements, while maintaining the high degree of accuracy expected as a whole. For example, the AR tools can capture a stair by capturing a reduced number data points, such as a width of the stair, a length of the stair, a total rise of the stair, and number of threads of the stair. The system can extrapolate the remaining structure of the stair from these limited data points instead of capturing whole data points of the stair. Examples are further described with respect to FIG. 10E.

If the stair includes a landing, the system 10 can capture the landing between each set of stairs using a room capture process described with respect to FIGS. 3-8. The system 10 can also capture walls by pointing the camera at a wall surface, or by drawing lines on the floor, as described with respect to FIGS. 3-8 and 10. If there are more stair sections to capture, the system 10 continue the stair capture process described with respect to FIGS. 9 and 10 until all stair sections and landings have been captured.

In another example, the system 10 can determine a height, a length, and a depth of a cabinet and each of different faces of the cabinet based on the three-dimensional data for the first corner location and second corner location and/or in a combination with predetermined data (e.g., data derived from a uniform building code or data from standard cabinets). Examples are further described with respect to FIGS. 11D and 12D. The system 10 can transmit the generated model of the building object to a workspace (e.g., another mobile device, or a software application) for further or future analysis. Examples are described with respect to FIG. 14.

FIGS. 10A-10E are screenshots illustrating stair capture functions and associated stair capture user interface AR tools provided by the systems and methods of the present disclosure. It is noted that all of the AR tools and associated functions discussed above in connection with capturing of interior and exterior features could also be used to capture stairs.

Figure 10A:
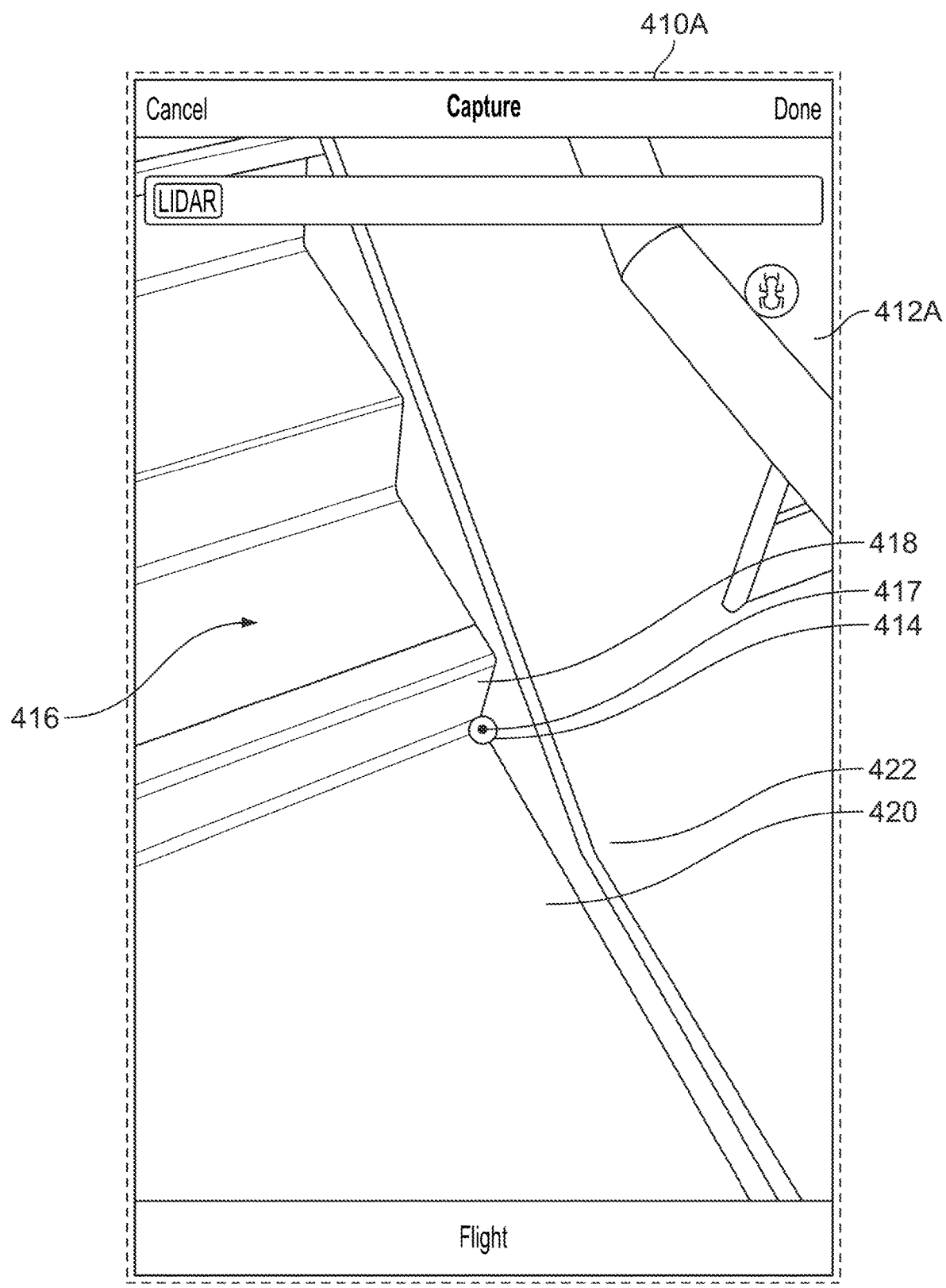
FIGS. 10A-10E are screenshots illustrating stair capture functions and associated stair capture user interface AR tools provided by the systems and methods of the present disclosure.
Figure 10B:
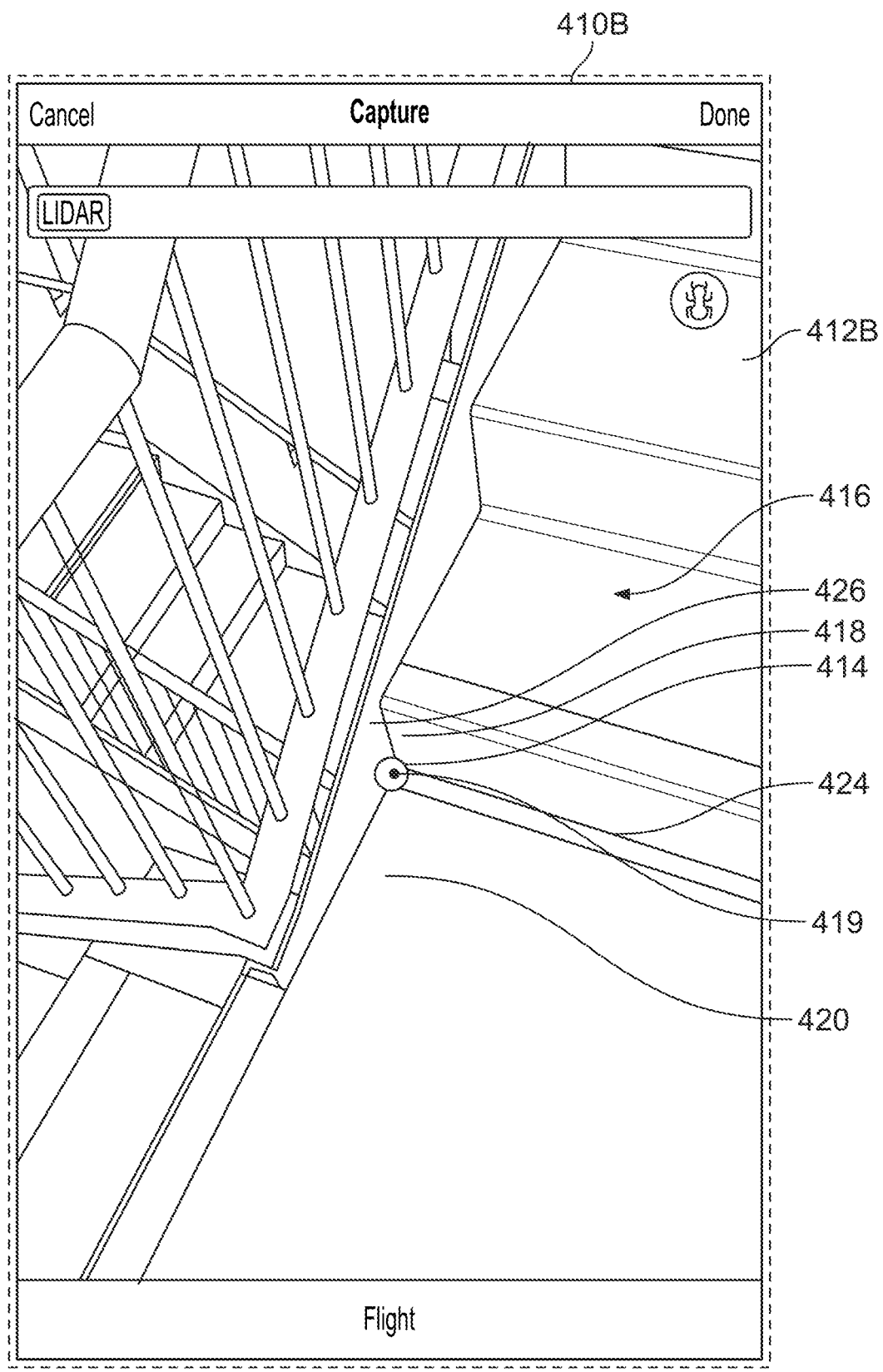

FIGS. 10A and 10B illustrate capturing a bottom of a stair. As can be seen in FIG. 10A, a user interface screen 410A displays an image frame 412A including an image of a stair 416 to be modeled, and an AR icon 414 displayed superimposed on the image frame 412A. The AR icon 414 could correspond to any of the AR icons and AR tools discussed above, as well as additional icons and tools discussed herein below. The AR icon 414 is located at a first corner location 417 of a bottom of the stair 416 where a bottom riser 418 meets a bottom floor 420 and a wall 422 by moving the camera and/or moving the AR icon 414. The user can actuate a capture button (e.g., the capture button 218 in FIG. 8A) to set the AR icon 414 at the first corner location 417. As can be seen in FIG. 10B, the AR icon 414 displayed superimposed on the image frame 412B of the user interface screen 410B can be controlled to draw a line 424 from the first corner location 417 (shown in FIG. 10A) to a second corner location 419 of the bottom of the stair 416 where the bottom riser 418 meets the bottom floor 420 and a side support 426, keeping the line 424 in the intersection of the bottom floor 420 and the bottom riser 418, and extending the line 424 across the entire width of the stair 416. The user can actuate a capture button to finalize the current location of the AR icon 414 at the second corner location 419 and the width of the stair 416.

Figure 10C:
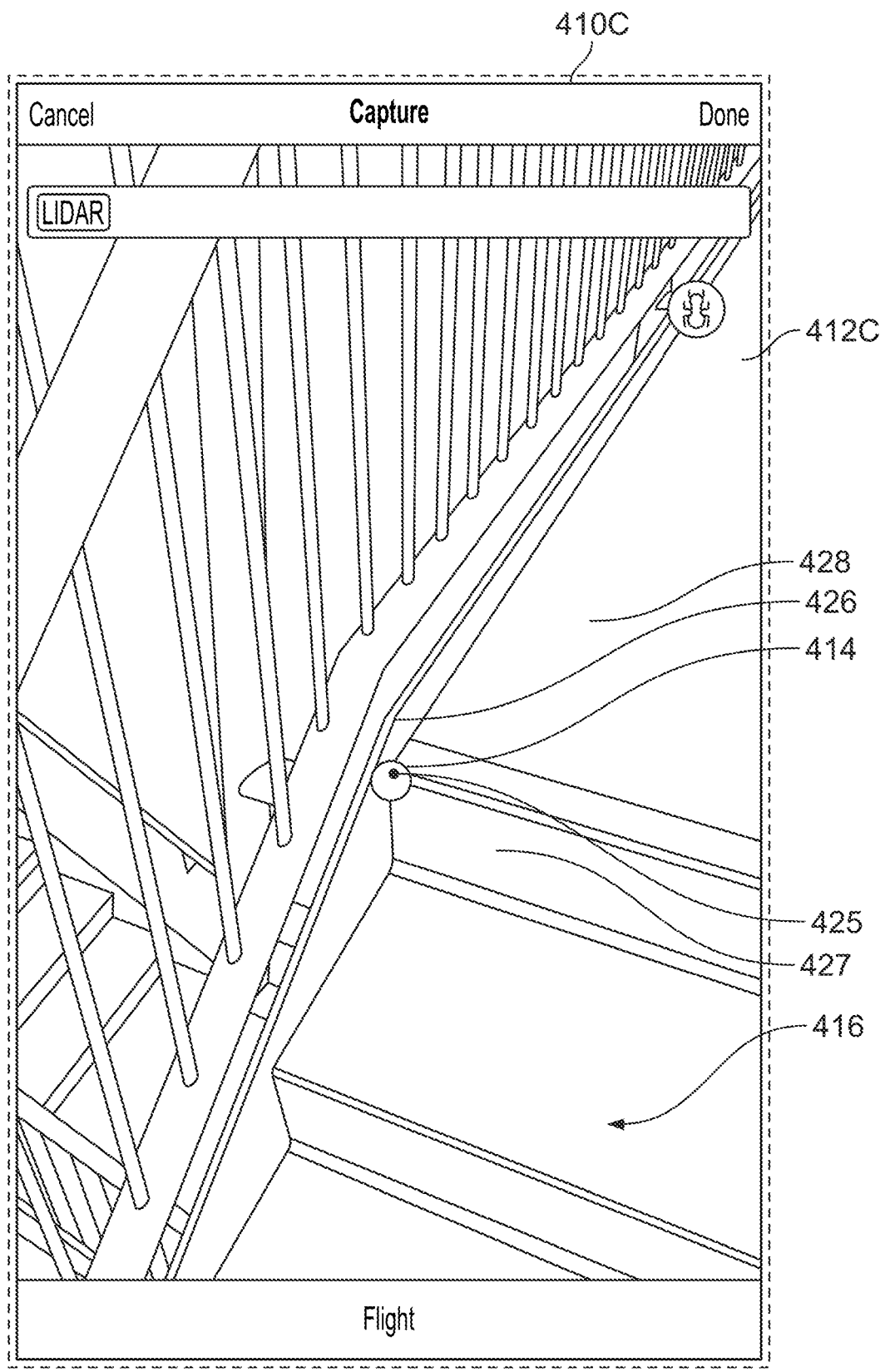
Figure 10D:
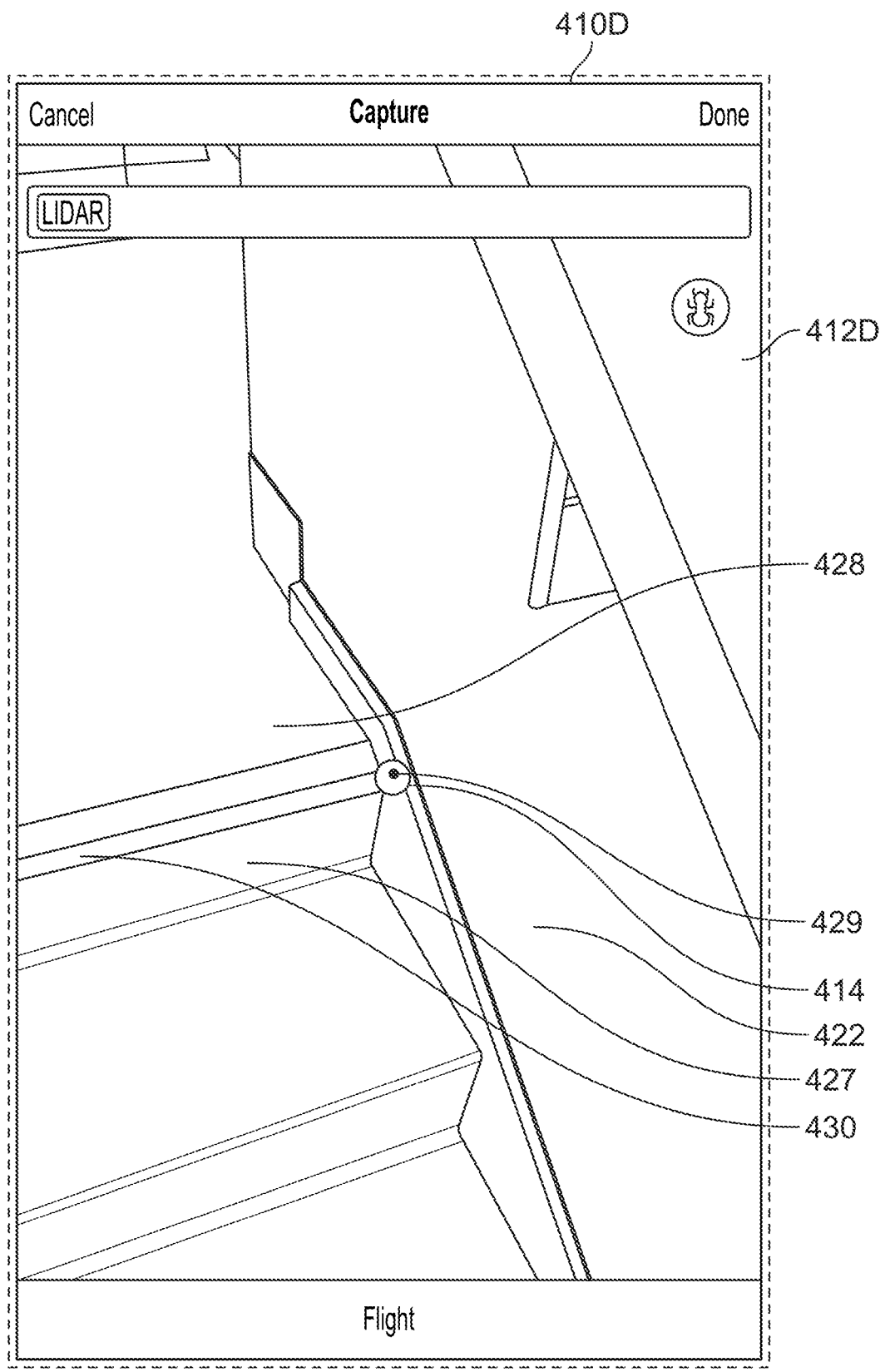

FIGS. 10C and 10D illustrate capturing a top of the stair 416. Similar to FIGS. 10A and 10B, the AR icon 414 displayed superimposed on the image frame 412C of the user interface screen 410C is controlled to be located at a third corner location 425 of a top of the stair 416 where a top riser 427 meets a top floor 428 and the side support 426 by moving the camera or moving the AR icon 414. The user can actuate a capture button (e.g., the capture button 218 in FIG. 8A) to set the current location of the AR icon 414 as the third corner location 425. As can be seen in FIG. 10D, the AR icon 414 displayed superimposed on the image frame 412D of the user interface screen 410D can be controlled to draw a line 430 from the third corner location 425 (as shown in FIG. 10C) to a fourth corner location 429 of the top of the stair 416 where top the riser 427 meets the top floor 428 and the wall 422, keeping the line 430 in the intersection of the top riser 427 and the top floor 428, and extending the line 430 across the entire width of the stair 416. The use can actuate a capture button to finalize the current location of the AR icon 414 at the fourth corner location 429 and the width of the stair 416.

Figure 10E:
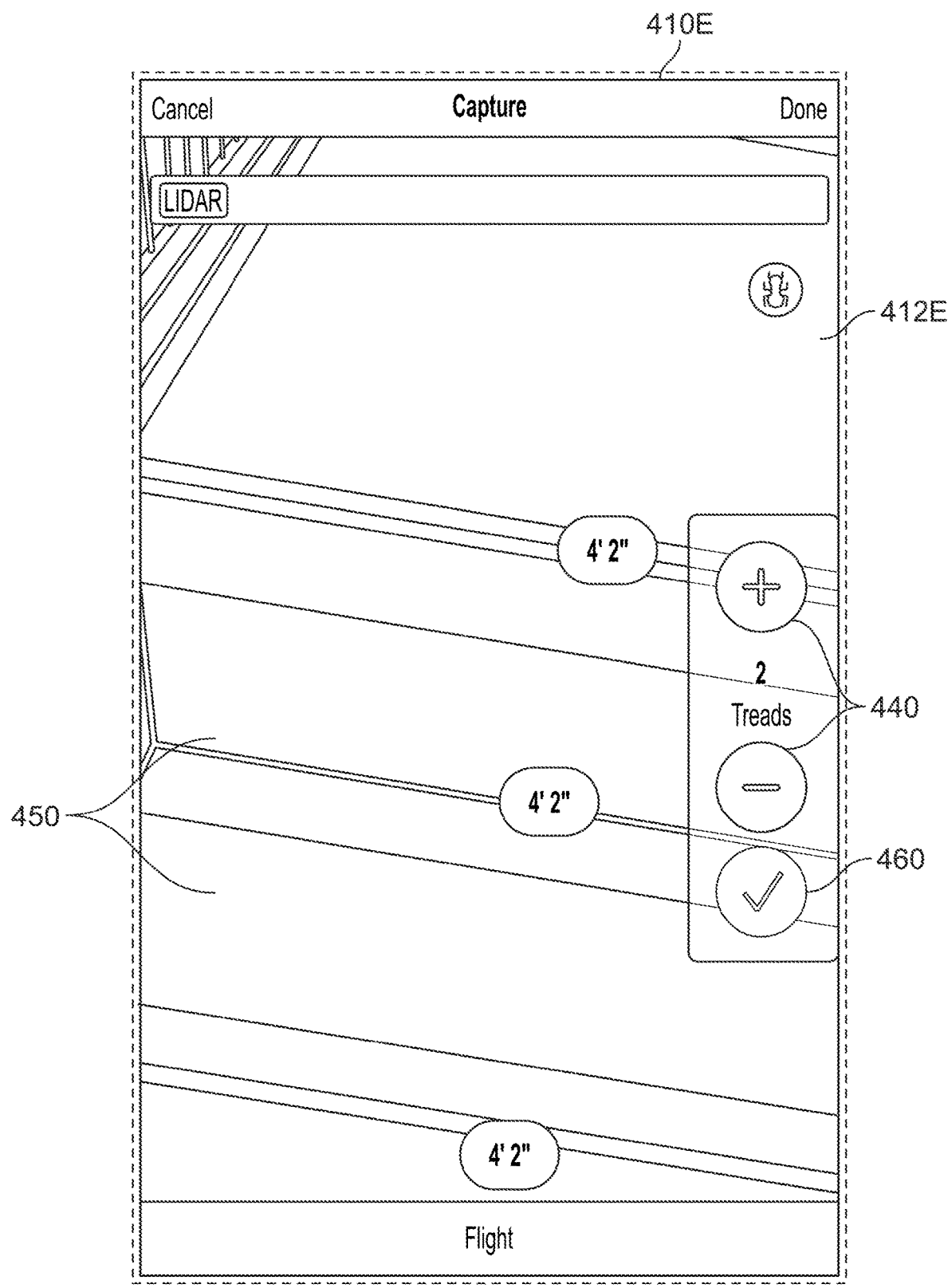

FIG. 10E illustrates capturing a number of treads 450 of the stair 416. The user can use buttons 440 displayed superimposed on the image frame 412E of the user interface screen 410E to specify (e.g., increase or decrease) the number of treads 450. When the number of treads 450 is correctly set, the user can actuate a checkmark button 460 to confirm and move to a next step.

FIGS. 11A-11D are screenshots illustrating cabinet face capture functions and associated cabinet face capture user interface AR tools provided by the systems and methods of the present disclosure. It is noted that the AR tools and associated functions discussed above with capturing of interior and exterior features and stairs could also be used to capture cabinets.

Figure 11A:
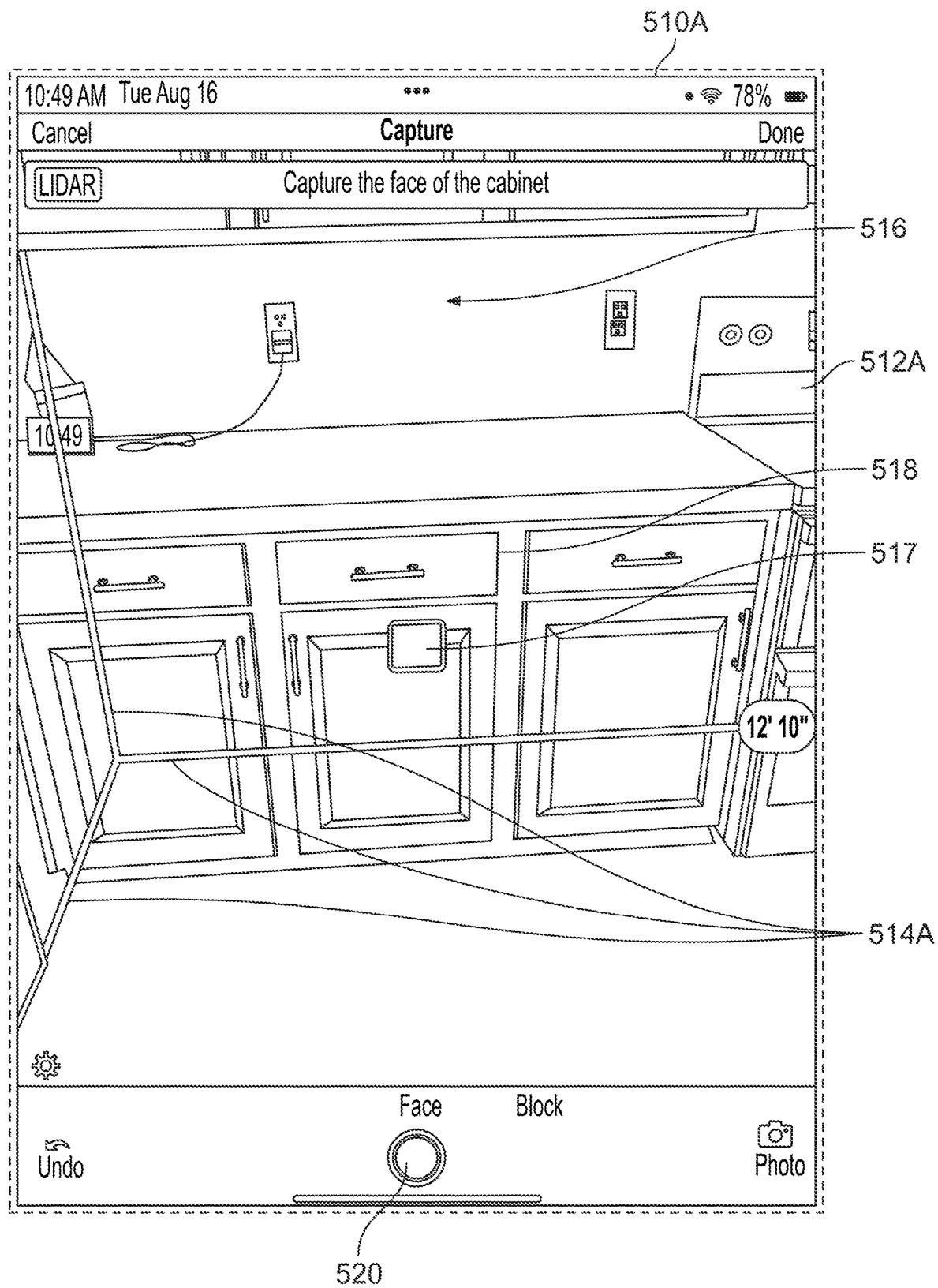
FIGS. 11A-11D are screenshots illustrating cabinet face capture functions and associated cabinet face capture user interface AR tools provided by the systems and methods of the present disclosure.

As can be seen in FIG. 11A, a user interface screen 510A displays an image frame 512A including an image of a cabinet 516 to be modeled, and a first AR tool 514A displayed superimposed on the image 512A. The first AR tool 514A could correspond to any of the AR icons/tools discussed above, as well as additional icons/tools discussed herein below. The first AR tool 514A is controlled to be located at a target location 517 within a front face 518 of the cabinet 516 to target the front face 518. The user can actuate a capture button 520 to capture the front face 518.

Figure 11B:
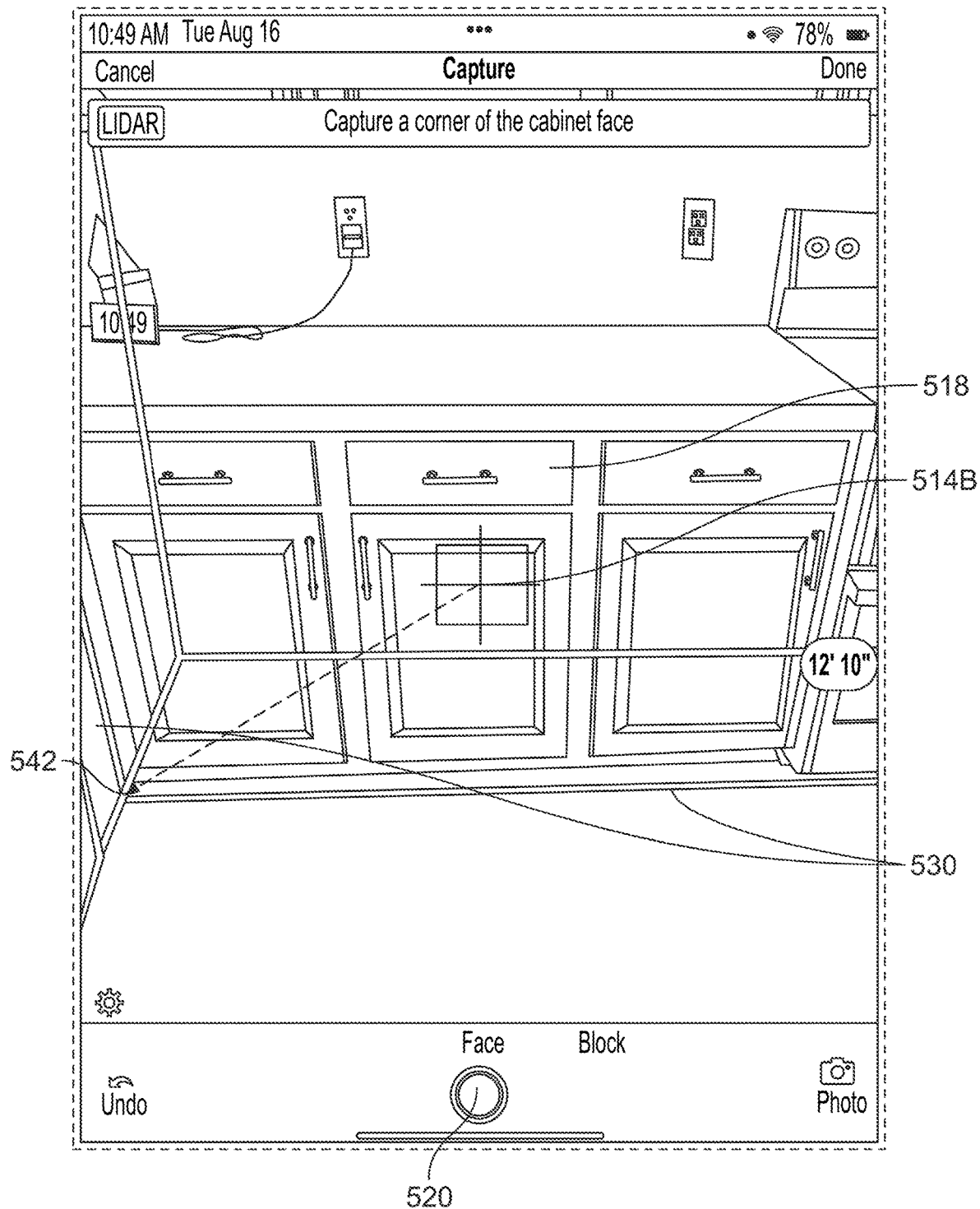

As can be seen in FIG. 11B, a second AR tool 514B (e.g., a crosshair) can be moved from the target location 517 (as shown in FIG. 11A) to a corner location 542 of the front face 518. The user can actuate the capture button 520 to set the second AR tool 514B at the corner location 542.

Figure 11C:
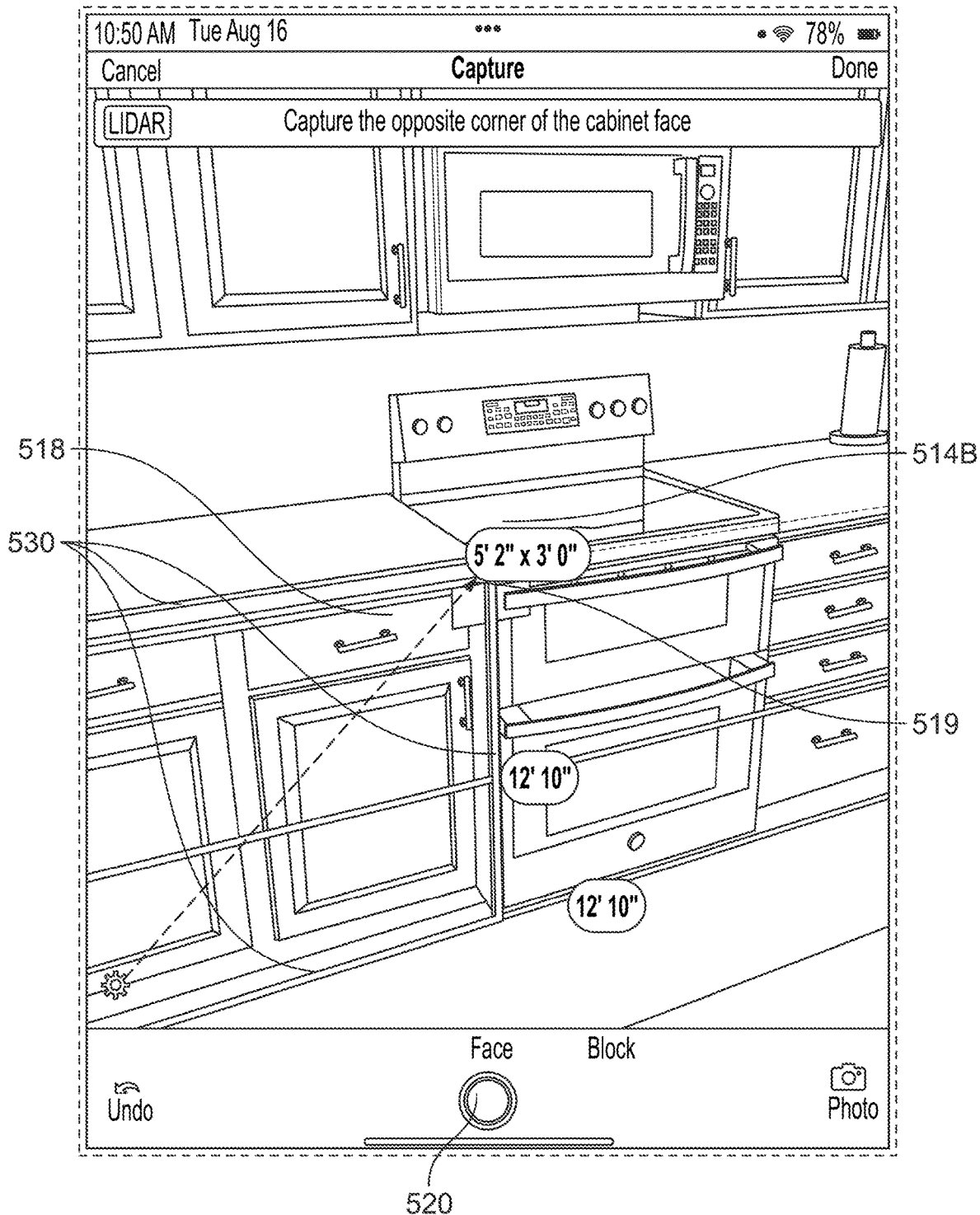

As can be seen in FIG. 11C, the second AR tool 514B can be located at an opposite diagonal corner location 519 of the front face 518. The front face 518 is outlined with the lines 530. The user can actuate the capture button 520 to set the second AR tool 514B at the opposite diagonal corner location 519.

Figure 11D:
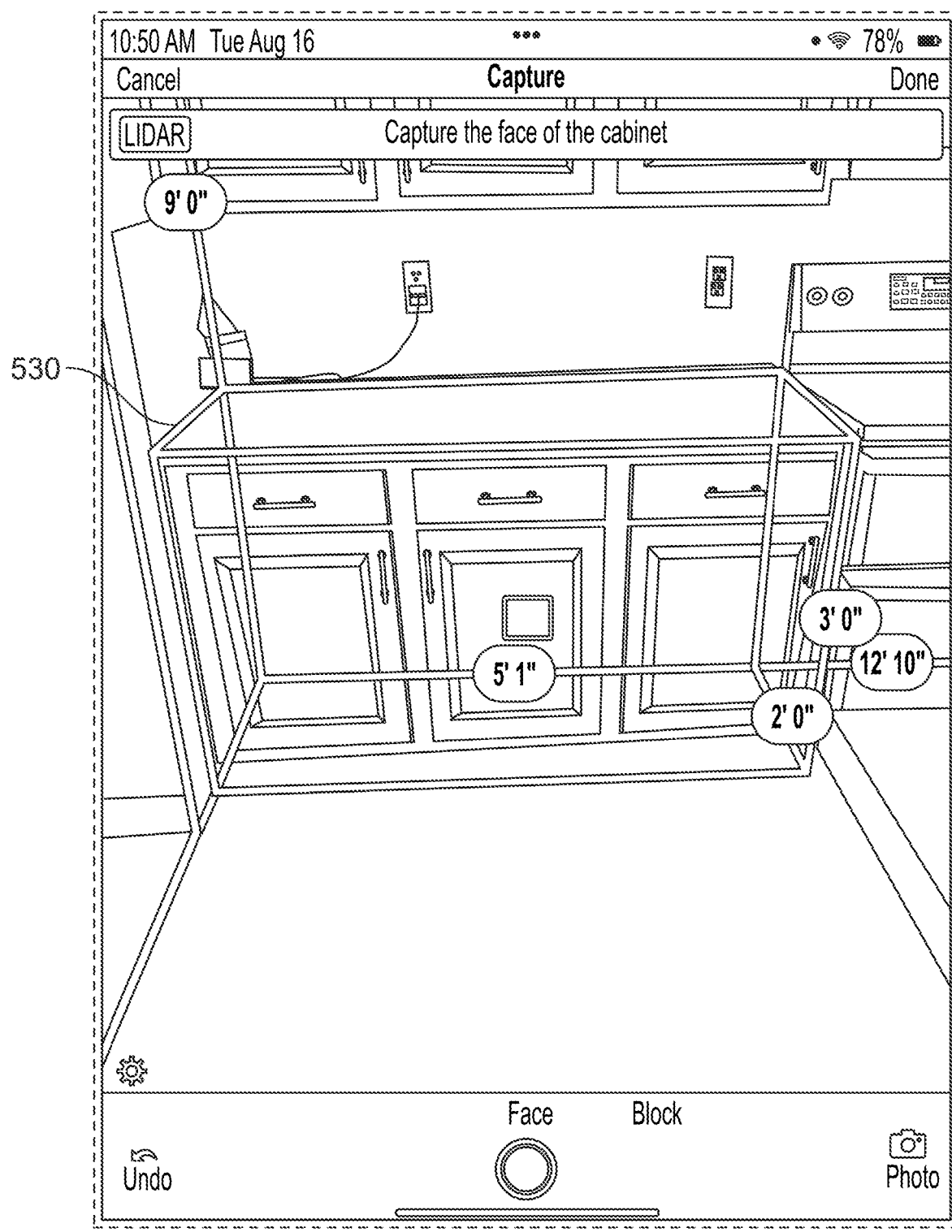

As can be seen in FIG. 11D, after the second AR tool 514B is set at the opposite diagonal corner location 519 in FIG. 11C, the cabinet 516 is outlined by the lines 530 to create a building model of the cabinet 616 that can be added into the workspace.

FIGS. 12A-12D are screenshots illustrating cabinet block capture functions and associated cabinet block capture user interface AR tools provided by the systems and methods of the present disclosure. It is noted that the AR tools and associated functions discussed above with capturing of interior and exterior features and stairs could also be used to capture cabinets.

Figure 12A:
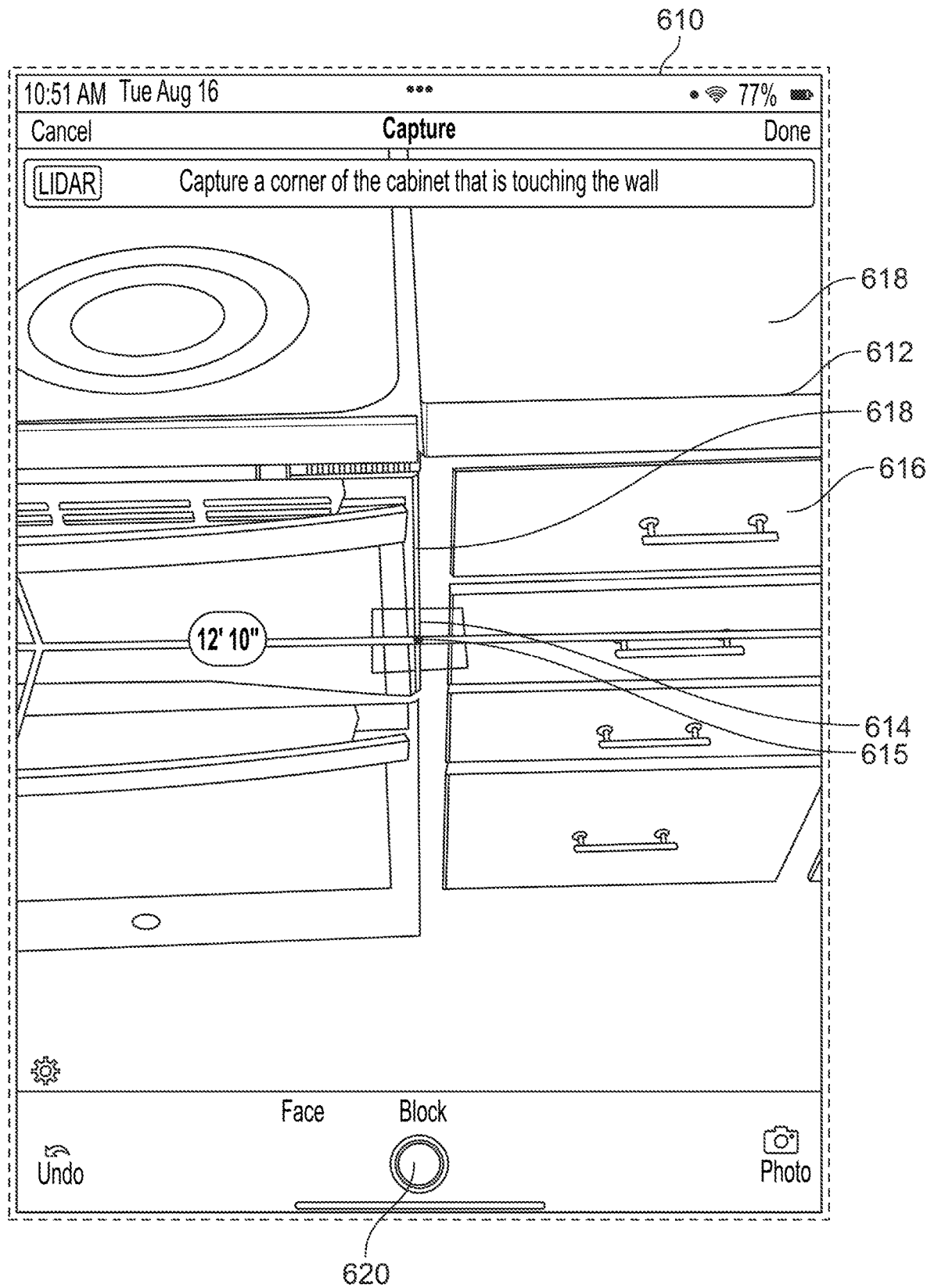
FIGS. 12A-12D are screenshots illustrating cabinet block capture functions and associated cabinet block capture user interface AR tools provided by the systems and methods of the present disclosure.

As can be seen in FIG. 12A, a user interface screen 610 displays an image frame 612 including an image of a cabinet 616 to be modeled, and an AR tool 614 displayed superimposed on the image 612. The AR tool 614 could correspond to any of the AR icons/tools discussed above, as well as additional icons/tools discussed herein below. The AR tool 614 (e.g., a crosshair) is located a target location 615 along an edge of the cabinet 516 where the end of the cabinet 616 meets a side wall 618. The user can actuate a capture button 620 to set the AR tool 614 at the target location 615.

Figure 12B:
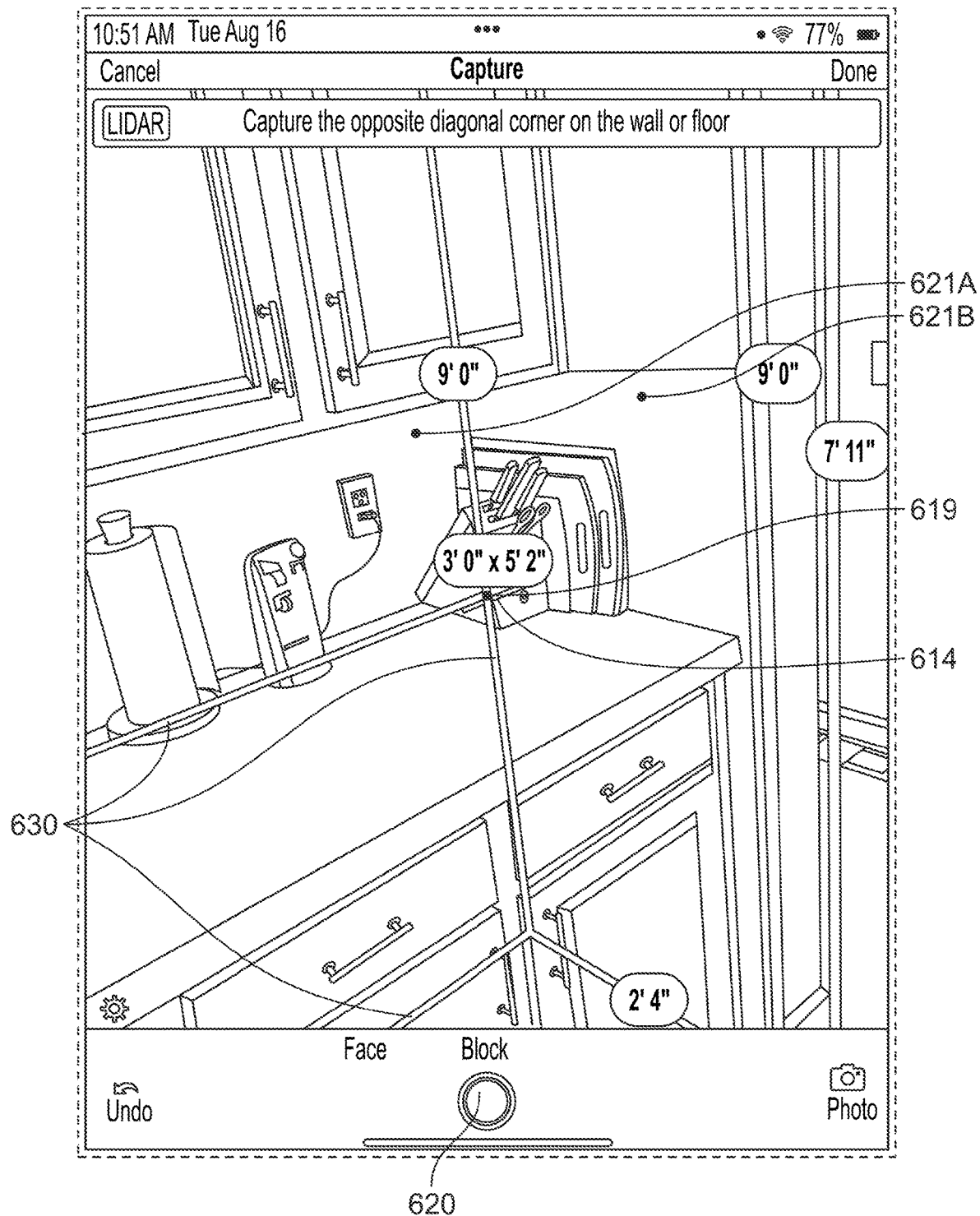

As can be seen in FIG. 12B, the AR tool 614 is located at a first corner location 619 of a back face of the cabinet 616 that is in contact with a wall 621A. The first corner location 619 is in a different plane from the target location 615 (shown in FIG. 12A). It is noted that the first corner location 619 can be in a same plane as the target location 615. The user can actuate the capture button 620 to set the AR tool 614 at the first corner location 619 to outline the back face of the cabinet 616 by lines 630.

Figure 12C:
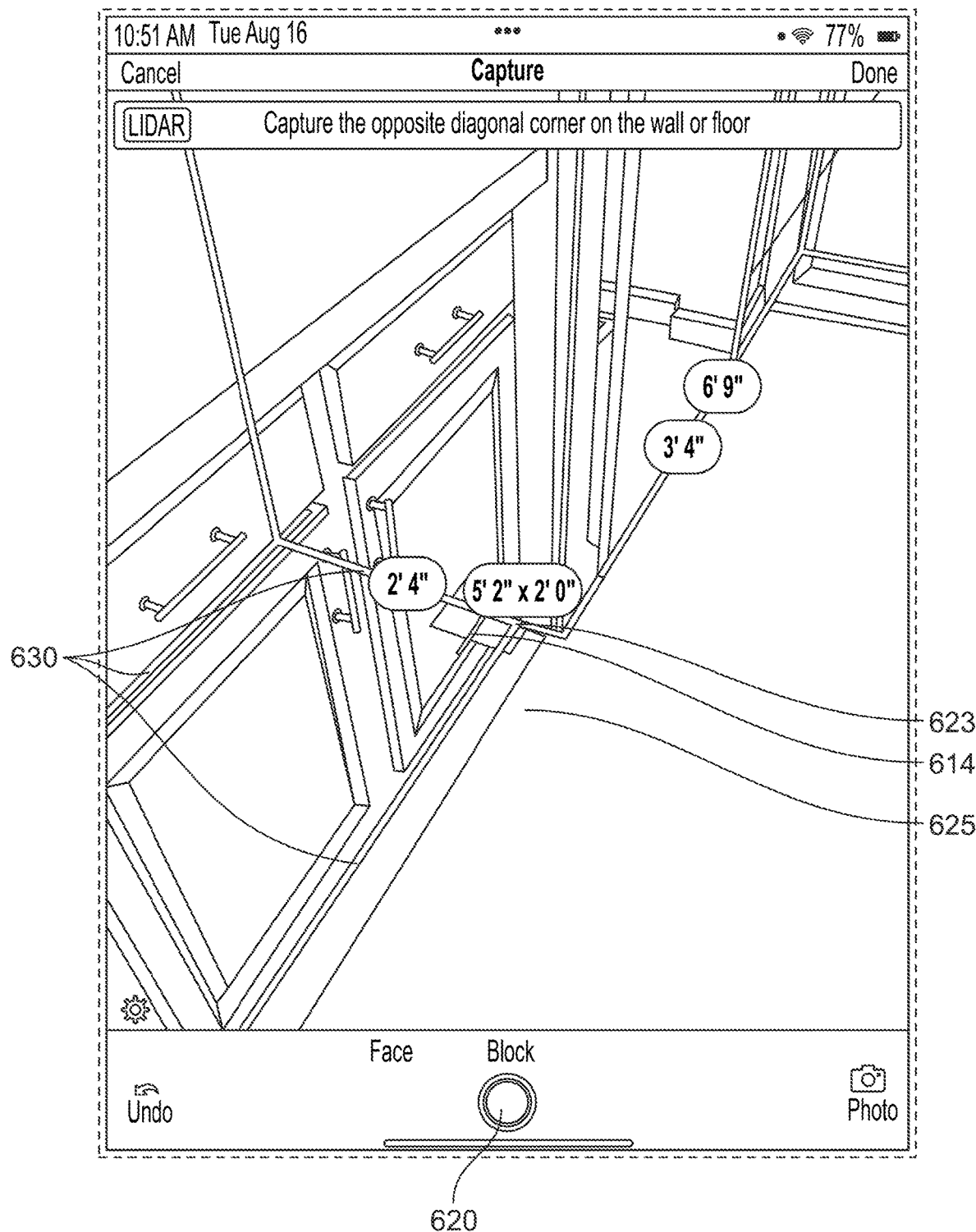

As can be seen in FIG. 12C, the AR tool 614 is located at a second corner location 623 of a bottom face of the cabinet 616 that is in contact with a floor 625. The first corner location 619 and the second corner location 623 can be diagonal corner locations of a side face of the cabinet 616 that is in contact with a side wall 621B. Both the back face and the bottom face intersects with the side face. The user can actuate the capture button 620 to set the AR tool 614 at the second corner location 623 to outline the bottom face of the cabinet 616 by lines 630. It is noted that the AR tool 614 could also outline any other face (e.g., a top face, a front face, a bottom face, a back face, side faces) of the cabinet 616.

Figure 12D:
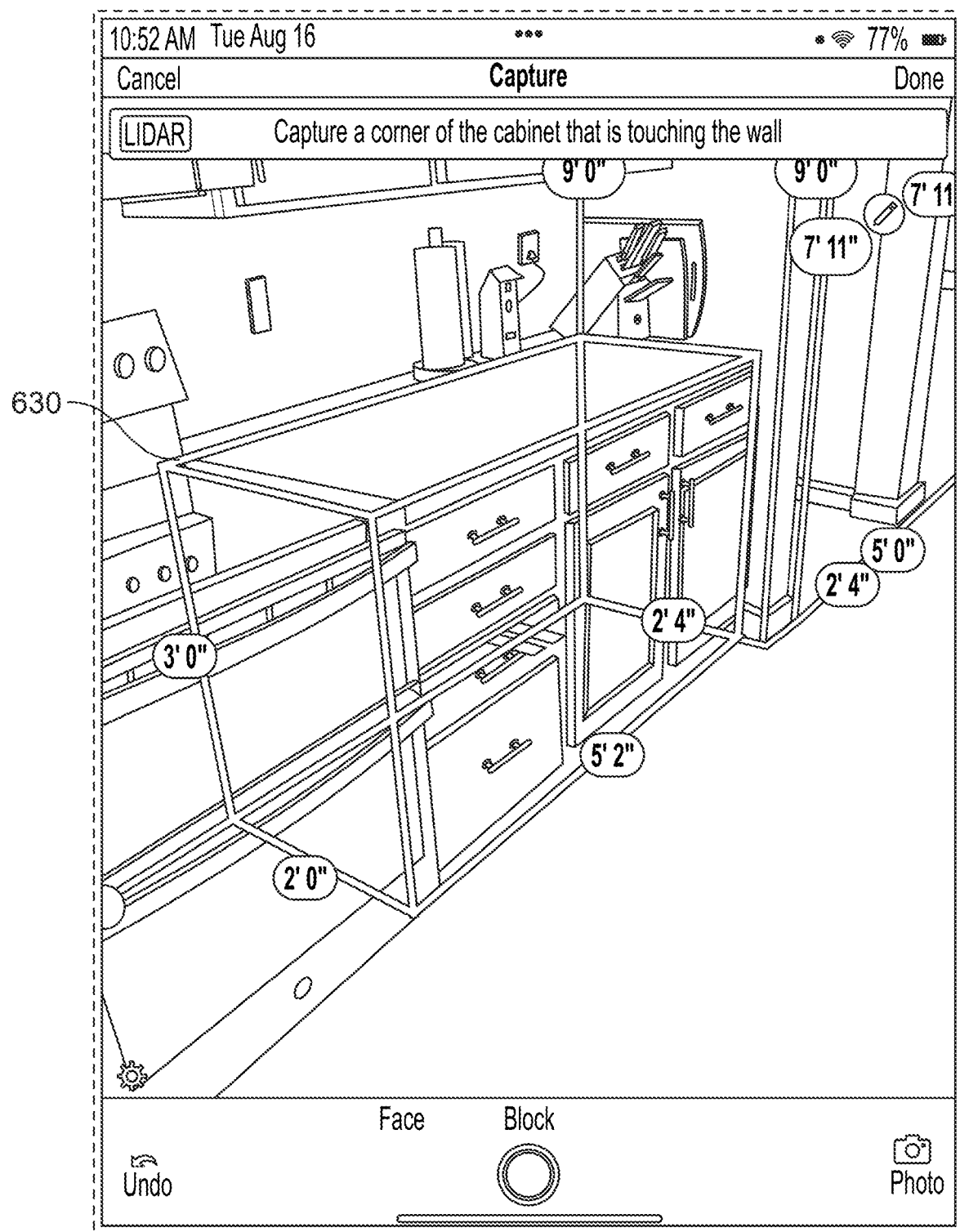

As can be seen in FIG. 12D, after the AR tool 614 outlines the back face in FIG. 12B and the bottom face in FIG. 12C, the entire cabinet 616 is automatically outlined by lines 630 to create a building model of the cabinet 616 that can be added into the workspace.

Figure 13:
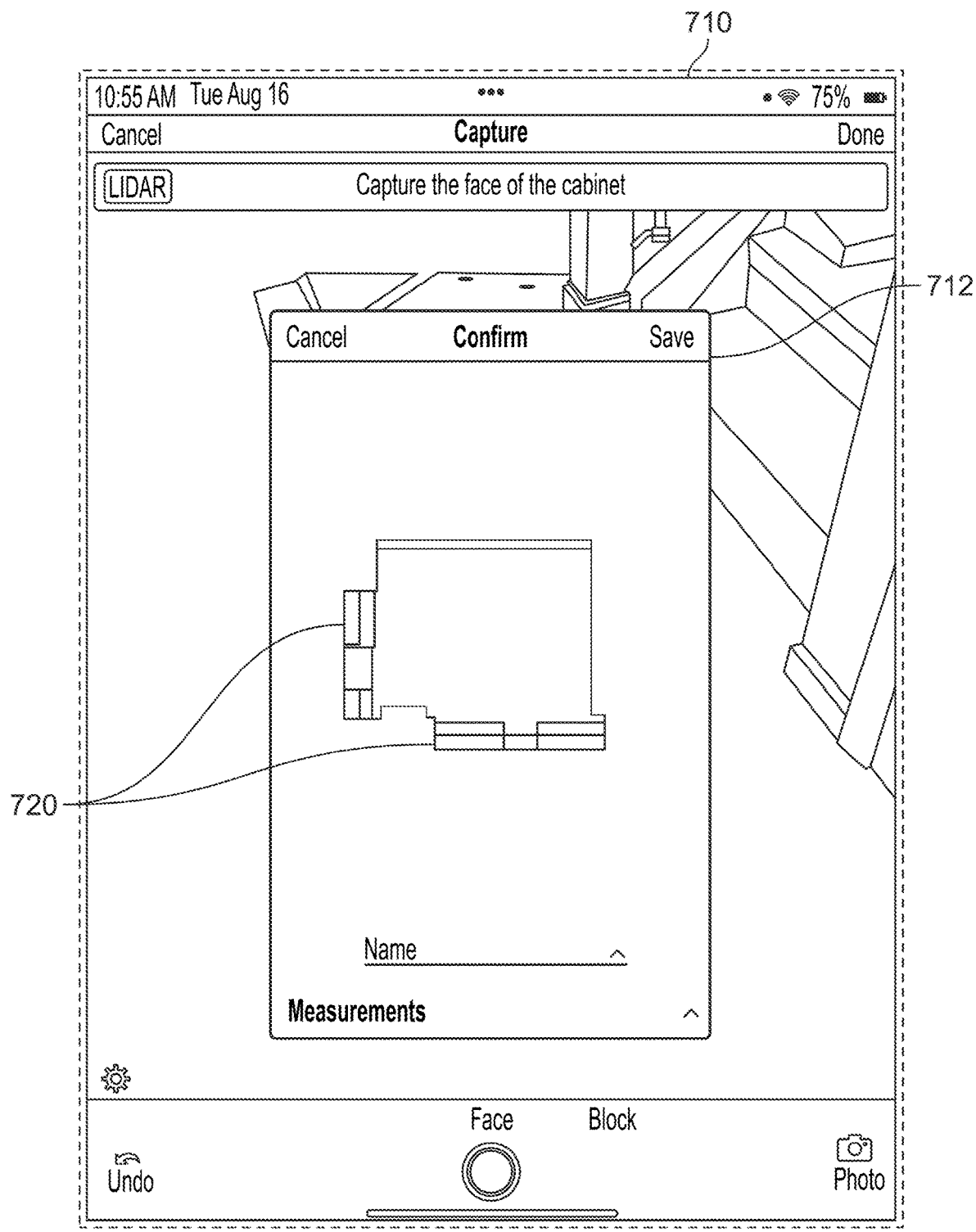
FIG. 13 is a screenshot illustrating a room confirmation screen provided by the systems and methods of the present disclosure.

FIG. 13 is a screenshot illustrating a room confirmation screen provided by the systems and methods of the present disclosure. A user interface screen 710 displays a pop-up window 712 including captured cabinets 720, which allows the user to save the captured cabinets 720 for analysis and/or move to a next step.

Figure 14:
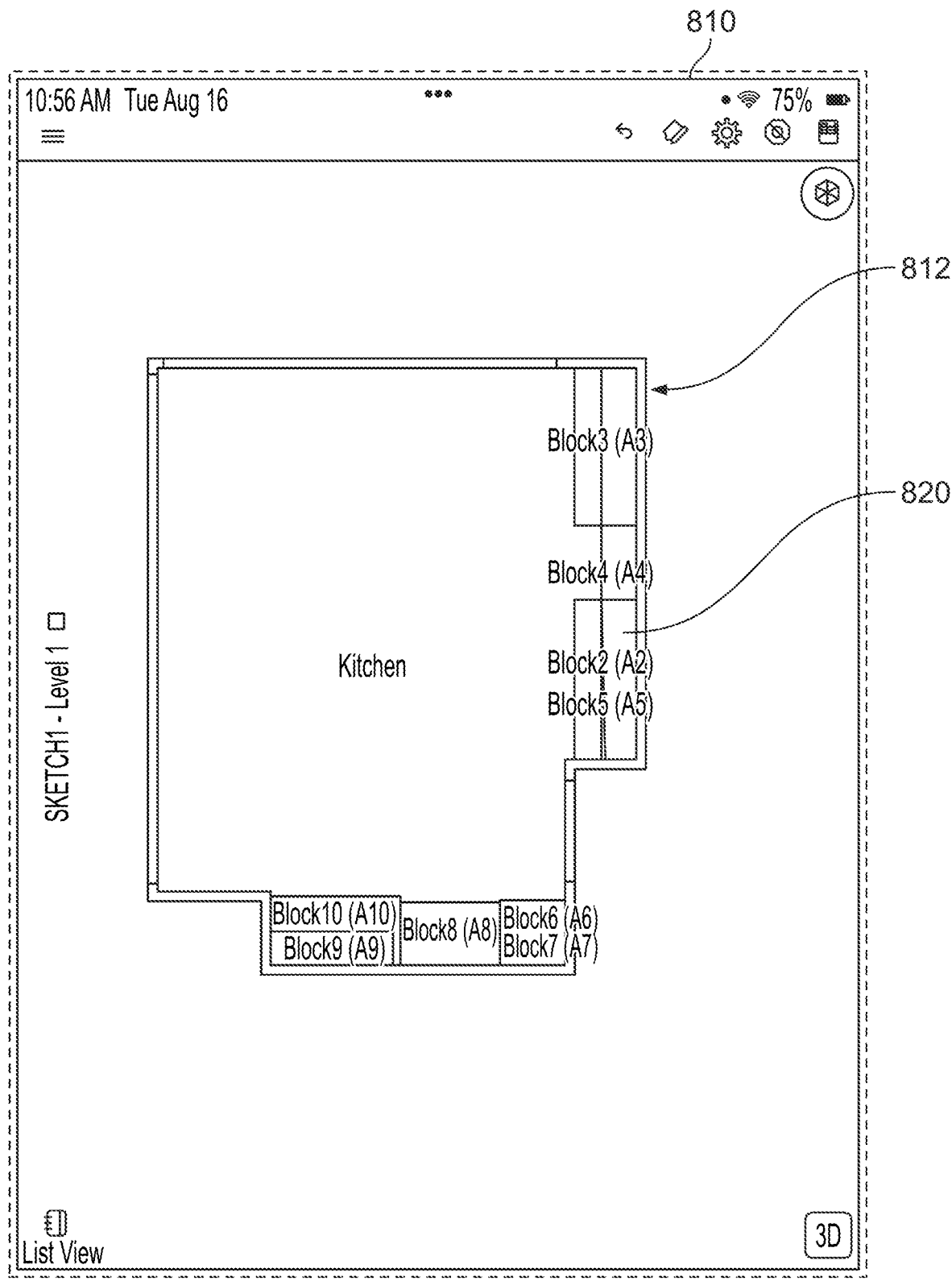
FIG. 14 is a screenshot illustrating a building model imported into a workspace.

FIG. 14 is a screenshot illustrating a building model imported into a workspace. A user interface screen 810 displays a building model 820 of the captured cabinets imported into a workspace 812 as standard blocks for further or future analysis.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A computer vision system for generating a model of a building object, comprising:
    a mobile device including a three-dimensional sensor, a camera, and a processor; and
    a memory in communication with the processor and storing modeling code, the processor executing the modeling code to perform the steps of:
        displaying an augmented reality (AR) icon on a display of a mobile device superimposed on an image frame acquired by a camera of the mobile device, the image frame comprising at least part of the building object to be modeled;
        placing the AR icon within the image frame at a first corner location of the building object;
        allowing a user to move the AR icon from the first corner location to a second corner location of the building object; and
        generating the model of the building object based at least in part on the first corner location and the second corner location,
    wherein the building object to be modeled comprises a first portion and a second portion, and the image frame comprises the first portion, wherein the AR icon is moved from the first corner location to the second corner location along a first width of the first portion,
    wherein the processor further performs the steps of:
    determining the first width of the first portion based at least in part on the first corner location and the second corner location;
    allowing the user to place the AR icon at a third corner location of the building object, wherein the image frame or the different image frame comprises the second portion of the building object;
    allowing the user to move the AR icon from the third corner location to a fourth corner location of the building object along a second width of the second portion of the building object; and
    determining the second width of the second portion based at least in part on the third corner location and the fourth corner location,
    wherein generating the model of the building object is further based at least in part on the first width of the first portion and the second width of the second portion, and
    wherein the processor further performs the steps of:
    determining a total rise of the building object based at least in part on the first, second, third and fourth corner locations; and
    determining a number of treads,
    wherein generating the model of the building object is further based at least in part on the total rise and the number of treads.

2. The system of claim 1, wherein the processor further performs the steps of:
    generating a first line in response to moving the AR icon from the first corner location to the second corner location; and
    generating a second line in response to moving the AR icon from the third corner location to the fourth corner location.

3. The system of claim 1, wherein the building object is a cabinet.

4. The system of claim 1, wherein the processor further performs the steps of:
    transmitting the model of the building object.

5. A computer vision method for generating a model of a building object, comprising:
    displaying an augmented reality (AR) icon on a display of a mobile device superimposed on an image frame acquired by a camera of the mobile device, the image frame comprising at least part of the building object to be modeled;
    placing the AR icon within the image frame at a first corner location of the building object;
    allowing a user to move the AR icon from the first corner location to a second corner location of the building object; and
    generating the model of the building object based at least in part on the first corner location and the second corner location,
    wherein the building object to be modeled comprises a first portion and a second portion, and the image frame comprises the first portion, wherein the AR icon is moved from the first corner location to the second corner location along a first width of the first portion,
    wherein the method further comprises:
    determining the first width of the first portion based at least in part on the first corner location and the second corner location;
    allowing the user to place the AR icon, within the image frame or a different image frame, at a third corner location of the building object, wherein the image frame or the different image frame comprises the second portion of the building object;
    allowing the user to move the AR icon from the third corner location to a fourth corner location of the building object along a second width of the second portion of the building object; and
    determining the second width of the second portion based at least in part on the third corner location and the fourth corner location, wherein generating the model of the building object is further based at least in part on the first width of the first portion and the second width of the second portion, and further comprising:
determining a total rise of the building object based at least in part on the first, second, third and fourth corner locations; and
determining a number of treads,
wherein generating the model of the building object is further based at least in part on the total rise and the number of treads.

6. The method of claim 5, further comprising:
generating a first line in response to moving the AR icon from the first corner location to the second corner location; and
generating a second line in response to moving the AR icon from the third corner location to the fourth corner location.

7. The method of claim 5, wherein the building object is a cabinet.

8. The method of claim 5, further comprising transmitting the model of the building object.

9. A computer vision system for generating a model of a building object, comprising:
a mobile device including a three-dimensional sensor, a camera, and a processor; and
a memory in communication with the processor and storing modeling code, the processor executing the modeling code to perform the steps of:
displaying an augmented reality (AR) icon on a display of a mobile device superimposed on an image frame acquired by a camera of the mobile device, the image frame comprising at least part of the building object to be modeled;
placing the AR icon within the image frame at a first corner location of the building object;
allowing a user to move the AR icon from the first corner location to a second corner location of the building object; and
generating the model of the building object based at least in part on the first corner location and the second corner location,
wherein the building object to be modeled comprises a first portion and a second portion, and the image frame comprises the first portion, wherein the AR icon is moved from the first corner location to the second corner location along a first width of the first portion, wherein the processor further performs the steps of:
determining the first width of the first portion based at least in part on the first corner location and the second corner location;
allowing the user to place the AR icon at a third corner location of the building object, wherein the image frame or the different image frame comprises the second portion of the building object;
allowing the user to move the AR icon from the third corner location to a fourth corner location of the building object along a second width of the second portion of the building object; and
determining the second width of the second portion based at least in part on the third corner location and the fourth corner location,
wherein generating the model of the building object is further based at least in part on the first width of the first portion and the second width of the second portion, and wherein the building object is a stair or a section of a stair.

10. The system of claim 9, wherein the processor further performs the steps of:
transmitting the model of the building object.

11. A computer vision method for generating a model of a building object, comprising:
displaying an augmented reality (AR) icon on a display of a mobile device superimposed on an image frame acquired by a camera of the mobile device, the image frame comprising at least part of the building object to be modeled;
placing the AR icon within the image frame at a first corner location of the building object;
allowing a user to move the AR icon from the first corner location to a second corner location of the building object; and
generating the model of the building object based at least in part on the first corner location and the second corner location,
wherein the building object to be modeled comprises a first portion and a second portion, and the image frame comprises the first portion, wherein the AR icon is moved from the first corner location to the second corner location along a first width of the first portion, wherein the method further comprises:
determining the first width of the first portion based at least in part on the first corner location and the second corner location;
allowing the user to place the AR icon, within the image frame or a different image frame, at a third corner location of the building object, wherein the image frame or the different image frame comprises the second portion of the building object;
allowing the user to move the AR icon from the third corner location to a fourth corner location of the building object along a second width of the second portion of the building object; and
determining the second width of the second portion based at least in part on the third corner location and the fourth corner location,
wherein generating the model of the building object is further based at least in part on the first width of the first portion and the second width of the second portion, and wherein the building object is a stair or a section of a stair.

12. The method of claim 11, further comprising transmitting the model of the building object.

13. A computer vision system for generating a model of a building object, comprising:
a mobile device including a three-dimensional sensor, a camera, and a processor; and
a memory in communication with the processor and storing modeling code, the processor executing the modeling code to perform the steps of:
displaying an augmented reality (AR) icon on a display of a mobile device superimposed on an image frame acquired by a camera of the mobile device, the image frame comprising at least part of the building object to be modeled;
placing the AR icon within the image frame at a first corner location of the building object;
allowing a user to move the AR icon from the first corner location to a second corner location of the building object;
generating the model of the building object based at least in part on the first corner location and the second corner location; and
determining a first outline of a first face of the building object based at least in part on the first corner location and the second location, wherein the first corner location is a corner location of the first face, and the second corner location is an opposite diagonal corner location of the first face relative to the first corner location, wherein generating the model of the building object is further based at least in part on the first outline of the first face of the building object.

14. The system of claim 13, wherein the building object is a cabinet.

15. The system of claim 13, wherein the processor further performs the steps of:

transmitting the model of the building object.

16. A computer vision method for generating a model of a building object, comprising:

displaying an augmented reality (AR) icon on a display of a mobile device superimposed on an image frame acquired by a camera of the mobile device, the image frame comprising at least part of the building object to be modeled;

placing the AR icon within the image frame at a first corner location of the building object;

allowing a user to move the AR icon from the first corner location to a second corner location of the building object;

generating the model of the building object based at least in part on the first corner location and the second corner location; and determining a first outline of a first face of the building object based at least in part on the first corner location and the second location, wherein the first corner location is a corner location of the first face, and the second corner location is an opposite diagonal corner location of the first face relative to the first corner location, wherein generating the model of the building object is further based at least in part on the first outline of the first face of the building object.

17. The method of claim 16, wherein the building object is a cabinet.

18. The method of claim 16, further comprising transmitting the model of the building object.

19. A computer vision system for generating a model of a building object, comprising:

a mobile device including a three-dimensional sensor, a camera, and a processor; and a memory in communication with the processor and storing modeling code, the processor executing the modeling code to perform the steps of:

displaying an augmented reality (AR) icon on a display of a mobile device superimposed on an image frame acquired by a camera of the mobile device, the image frame comprising at least part of the building object to be modeled;

placing the AR icon within the image frame at a first corner location of the building object;

allowing a user to move the AR icon from the first corner location to a second corner location of the building object;

generating the model of the building object based at least in part on the first corner location and the second corner location;

determining a first outline of a first face of the building object based at least in part on the first corner location, wherein the first corner location is a corner location of the first face; and determining a second outline of a second face of the building object based at least in part on the second corner location, wherein the second corner location is a corner location of the second face, wherein generating the model of the building object is further based at least in part on the second outline of the second face of the building object.

20. The system of claim 19, wherein the first corner location and the second corner location are diagonal corner locations of a third face of the cabinet, the third face intersecting with the first face and the second face.

21. The system of claim 19, wherein the building object is a cabinet.

22. The system of claim 19, wherein the processor further performs the steps of:

transmitting the model of the building object.

23. A computer vision method for generating a model of a building object, comprising:

displaying an augmented reality (AR) icon on a display of a mobile device superimposed on an image frame acquired by a camera of the mobile device, the image frame comprising at least part of the building object to be modeled;

placing the AR icon within the image frame at a first corner location of the building object;

allowing a user to move the AR icon from the first corner location to a second corner location of the building object; and generating the model of the building object based at least in part on the first corner location and the second corner location;

determining a first outline of a first face of the building object based at least in part on the first corner location, wherein the first corner location is a corner location of the first face; and determining a second outline of a second face of the building object based at least in part on the second corner location, wherein the second corner location is a corner location of the second face, wherein generating the model of the building object is further based at least in part on the second outline of the second face of the building object.

24. The method of claim 23, wherein the first corner location and the second corner location are diagonal corner locations of a third face of the cabinet, the third face intersecting with the first face and the second face.

25. The method of claim 23, wherein the building object is a cabinet.

26. The method of claim 23, further comprising transmitting the model of the building object.

* * * * *